US012698386B2

(12) United States Patent
Soman et al.

(10) Patent No.: US 12,698,386 B2
(45) Date of Patent: Aug. 4, 2026

(54) METHOD FOR FORMING AND 3D PRINTING DOUBLE NETWORK HYDROGELS USING TEMPERATURE-CONTROLLED PROJECTION STEREOLITHOGRAPHY

(71) Applicants: Pranav Soman, Chittenango, NY (US); Puskal Kunwar, East Syracuse, NY (US)

(72) Inventors: Pranav Soman, Chittenango, NY (US); Puskal Kunwar, East Syracuse, NY (US)

(73) Assignee: Syracuse University, Syracuse, NY (US)

( * ) Notice: Subject to any disclaimer, the term of this patent is extended or adjusted under 35 U.S.C. 154(b) by 133 days.

(21) Appl. No.: 18/605,027

(22) Filed: Mar. 14, 2024

(65) Prior Publication Data

US 2024/0309196 A1     Sep. 19, 2024

Related U.S. Application Data

(60) Provisional application No. 63/451,952, filed on Mar. 14, 2023.

(51) Int. Cl.
*C08L 33/26* (2006.01)
*B29C 35/08* (2006.01)
(Continued)

(52) U.S. Cl.
CPC ............ *C08L 33/26* (2013.01); *B29C 64/124* (2017.08); *B29C 64/245* (2017.08);
(Continued)

(58) Field of Classification Search
CPC ..... C08L 33/26; B29C 64/124; B29C 64/245; B29C 64/268; B29C 64/295;
(Continued)

(56) References Cited

U.S. PATENT DOCUMENTS

2019/0375014 A1 * 12/2019 Kernan ..................... B28B 1/00
2023/0398803 A1 * 12/2023 Roth ...................... C09D 11/04
(Continued)

*Primary Examiner* — Michael M. Robinson
(74) *Attorney, Agent, or Firm* — David L. Nocilly; Bond Schoeneck & King PLLC

(57) ABSTRACT

An apparatus and method for shaping double-network hydrogels into customized 3D structures. A one-pot prepolymer formulation containing photo-cross-linkable acrylamide and thermoreversible sol-gel κ-carrageenan with a suitable crosslinker, and photo-initiator/absorbers was used. The formulation was polymerized using a TOPS system with heating stage to photo-polymerize the primary acrylamide network into a 3D structure above the sol-gel transition of κ-carrageenan (80° C.). Cooling down then generates the secondary physical κ-carrageenan network to realize tough double-network hydrogel structures. Printed 3D structures had superior lateral (37 μm) and vertical (180 μm) resolutions and 3D design freedoms (internal voids) that exhibit ultimate stress and strain of 200 kPa and 2400% respectively under tension, and simultaneously exhibit high compression stress of 15 MPa with a strain of 95%, both with high recovery rates. The apparatus and method can be employed with other double-network hydrogels to make multifunctional soft devices for a range of applications.

10 Claims, 32 Drawing Sheets

(51) Int. Cl.

| | |
|---|---|
| *B29C 64/124* | (2017.01) |
| *B29C 64/209* | (2017.01) |
| *B29C 64/245* | (2017.01) |
| *B29C 64/268* | (2017.01) |
| *B29C 64/295* | (2017.01) |
| *B29K 33/00* | (2006.01) |
| *B29K 105/00* | (2006.01) |
| *B33Y 10/00* | (2015.01) |
| *B33Y 30/00* | (2015.01) |
| *B33Y 40/20* | (2020.01) |
| *B33Y 70/00* | (2020.01) |
| *C08J 3/075* | (2006.01) |

(52) U.S. Cl.
 CPC .......... *B29C 64/268* (2017.08); *B29C 64/295*
 (2017.08); *B33Y 10/00* (2014.12); *B33Y 30/00*
 (2014.12); *B33Y 40/20* (2020.01); *B33Y 70/00*
 (2014.12); *C08J 3/075* (2013.01); *B29C
 2035/0838* (2013.01); *B29C 64/209* (2017.08);
 *B29K 2033/26* (2013.01); *B29K 2105/0002*
 (2013.01); *B29K 2105/0061* (2013.01); *C08J
 2333/26* (2013.01); *C08J 2405/00* (2013.01)

(58) Field of Classification Search
 CPC .......... B29C 64/209; B29C 2035/0838; B29C
 64/129; B29C 64/264; B33Y 10/00;
 B33Y 30/00; B33Y 40/20; B33Y 70/00;
 B33Y 80/00; C08J 3/075; C08J 2333/26;
 C08J 2405/00; B29K 2033/26; B29K
 2105/0002; B29K 2105/0061
 See application file for complete search history.

(56) References Cited

U.S. PATENT DOCUMENTS

| | | | | |
|---|---|---|---|---|
| 2024/0269922 A1* | 8/2024 | Hartman | .......... | B29D 11/00923 |
| 2025/0043142 A1* | 2/2025 | Melo Rodriguez | .... | A61K 6/898 |
| 2025/0091285 A1* | 3/2025 | Butler | .................. | B29C 64/194 |
| 2025/0296285 A1* | 9/2025 | Wanha | .................. | B29C 64/321 |

* cited by examiner (C)

METHOD FOR FORMING AND 3D PRINTING DOUBLE NETWORK HYDROGELS USING TEMPERATURE-CONTROLLED PROJECTION STEREOLITHOGRAPHY

CROSS-REFERENCE TO RELATED APPLICATIONS

The present application claims priority to U.S. Provisional Application No. 63/451,952, filed on Mar. 14, 2023.

STATEMENT REGARDING FEDERALLY SPONSORED RESEARCH AND DEVELOPMENT

This invention was made with government support under Grant No. R21AR076645-01 and R21GM141573 awarded by the National Institution of Health (NIH). The government has certain rights in the invention.

BACKGROUND

1. Field

The present disclosure relates to double-network hydrogels and, more specifically, to an apparatus and method for forming complex three-dimensional shapes from such hydrogels.

2. Description of the Related Art

Hydrogel materials have found applications in drug delivery, tissue engineering, biosensing, soft robotics, flexible electronics, and soft photonics. However, traditional single-network hydrogels exhibit inferior mechanical properties which limit their use in the field. To address this challenge, double network (DN) hydrogels have been developed for applications that require superior toughness, stretchability, and compressive strength. Typical DN hydrogels consist of two entangled networks that can be polymerized using two independent stimuli; one network allows energy dissipation during deformation while the other network provides toughness and/or stretchability. Many one-pot synthesis strategies (sol-gel transitions, click chemistries, sequential polymerization) have been used to synthesize DN gels, however, shaping them into customized 3D structures remains a significant challenge. Often, conventional molding and casting methods are used to generate simple geometries such as sheets, slabs, and discs. Extrusion-based 3D printing with some DN hydrogels can print customized 3D shapes, however, the resolution and speed remain low. High-resolution DN hydrogel structures can be printed using light-based methods, however rapid photo-crosslinking with DN hydrogels is a significant materials challenge that has proven difficult to overcome.

Bottom-up Projection stereolithography (PSLA) has emerged as the favorite light-based 3D printing method due to its capability to make customized parts with microscale resolution and superior design flexibility. A typical setup consists of spatially modulated light patterns projected through a transparent bottom window to crosslink photosensitive liquid resin in XY plane before moving the stage up (Z-direction) to print the structure in layer-by-layer manner. Unfortunately, many DN resins do not meet the criteria of low viscosity and rapid photo-crosslinking at specific wavelengths. For instance, thermoreversible sol-gel transitions require elevated temperatures beyond the operating range of current PSLA printers, while reaction durations and crosslinking times for orthogonal click chemistries remain too long for PSLA (hours). New strategies that combine PSLA technology with DN hydrogels will likely lead to innovative multifunctional soft devices that require superior mechanical properties. Accordingly, there is a need in the art for an approach that can quickly and easily produce high-resolution DN hydrogel structures.

BRIEF SUMMARY

The present invention is a simple one-pot PSLA printing strategy that combines the advantages of PSLA (rapid, high-resolution, 3D design flexibility) and hydrogels (transparency, hydration) to shape DN gels into complex geometries with superior mechanical properties (high strength in both tension and compression).

In the first aspect, the present invention comprises an apparatus for forming a three-dimensional structure that has a sample holder including a metal plate having a fabrication hole formed therethrough and a transparent dish positioned on top of the metal plate, a source of heat coupled to the metal plate. A source of modulated irradiation is positioned below said metal plate and configured to deliver a spatially modulated pattern of light through said fabrication hole to selectively polymerize a first component (acrylamide) of double network hydrogel. Wherein the source of heat is capable of maintaining the sample holder at a predetermined temperature that is above a transition temperature of a second component ($\kappa$-carrageenan)) of said double network hydrogel.

In another aspect, the present invention is a method of forming a three-dimensional structure that involves providing a sample holder including a metal plate having a fabrication window formed therethrough and a transparent dish positioned on top of the metal plate, a source of heat coupled to the metal plate, and a source of modulated irradiation positioned below said metal plate and configured to deliver a spatially modulated pattern of light through said fabrication hole, supplying a formulation including a set of components for double network hydrogen onto the sample holder, wherein a first component of said set of components is a photo-crosslinked prepolymer and a second component of said set of components is a physical crosslinked prepolymer. The method further comprises maintaining a temperature of said sample holder above the transition temperature of the second component with the source of heat while simultaneously polymerizing the first component of said formulation with said spatially modulated pattern of light until the first component is selectively polymerized into a predetermined structure, and then cooling the formulation so that the second component polymerizes.

To demonstrate how the present invention can be used to make multifunctional soft devices, an axicon lens was printed using DN gel and demonstrated that dynamic stretching can be used to modulate its optical performance. The present invention may thus expand the design freedoms and the material library for making stimuli-responsive soft machines using DN hydrogels.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1 is a series of panels of: (A) Schematic diagram of DN gels formed by photocrosslinking and thermoreversible sol-gel transition. Acrylamide in the presence of crosslinker MBBA and photoinitiator LAP formed the first network through irreversible photocrosslinking. κ-carrageenan formed the second network by reversible physical crosslinking via sol-gel transition; (B) Schematic setup of the Temperature Controlled Projection SLA (TOPS) hydrogel for printing 2D and 3D DN gels structures; and (C) The 3D model of the sample holder was used as a computational domain consisting of a PDMS dish with a copper plate. Temperature distribution over the PDMS layer at the plane corresponding to section A-A' at t=90 seconds when the steady state was reached.

FIG. 2 is a series of panels of: (A-B) image and plot depicting the lateral resolution of printed structure using DN gels (scale bar—200 µm); (C) Plot showing the axial resolution of printed DN gels structure; (D) Schematic of 2D printing of planar structure and computer-generated digital mask for printing chemical structure of acrylamide and logo of Bioinspired Institute; (E-F) 2D printed acrylamide structure before the development and Logo of Bioinspired Institute after the development of structure (scale bar—4 mm); (G) 3D CAD model, corresponding computer-generated digital mask and 3D printed structure of Mayan pyramid using laser power of 2.17 mW/cm² and exposure time of 15 seconds/layer (scale bar—5 mm); (H) CAD model, digital masks, and 3D printed lattice structure. The printed structure was dipped into ethanol for 30 minutes to remove tartrazine and enhance the contrast for imaging (Scale bar—5 mm).

FIG. 3 is a series of panels of: (A)(i) Schematic and printed dog-bone structure using a hybrid gel structure with laser power of 2.17 mW/cm² and exposure time of 60 seconds; (ii) Stress-strain plot obtained from dog-bone structures printed using DN gel, acrylamide-only gel, and carrageenan-only gel. Ultimate stress and ultimate strain of the fabricated structures are also depicted; (B) Ultimate stress and ultimate strain of DN gel structures printed by varying exposure time; and (C-E) Ultimate stress and ultimate strain of DN gel structures printed with varying proportions of the photoinitiator, cross-linker, and κ-carrageenan.

FIG. 8 is a series of panels of (A) Solution to the necking behavior; (i) Comparison of the stress-strain plot of structure with necking behavior and without necking behavior (ii) photographs showing the necked and un-necked structure during stretching; (B) Stress plotted during three cycles of loading and reloading (i) with the strain of (480%) (ii) with the strain of (800%); and (C)(i) FTIR spectra of molded and casted κ-carrageenan, TOPS-printed PAAm, and DN gels (ii) FTIR spectra (zoomed) acquired from as-printed, dry, and swollen DN gels dog-bone structures before and after stretching.

Figure 9:
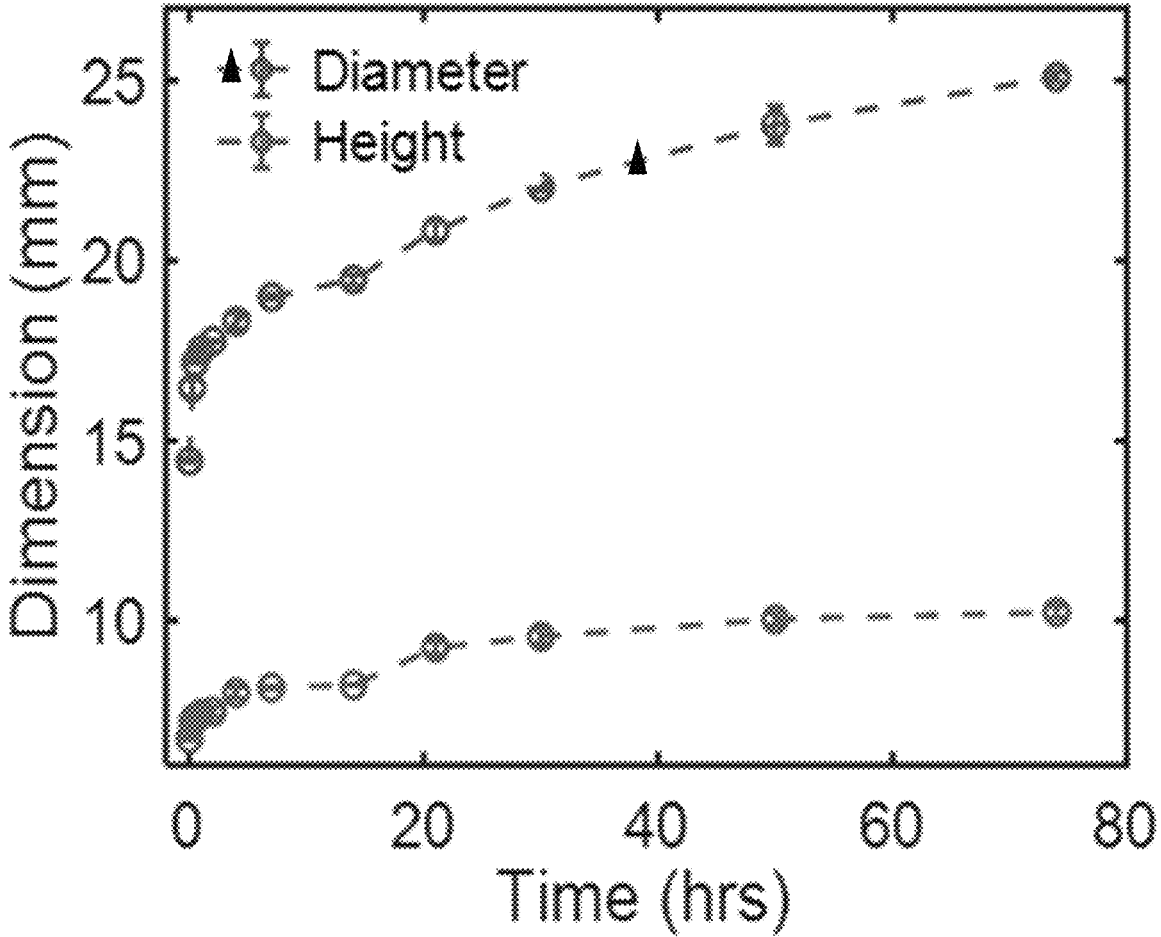

FIG. 9 is a plot of swelling of TOPS printed DN gels cylindrical stud and associated dimension (Diameter and Height) recorded for 78 hours.

Figure 10:
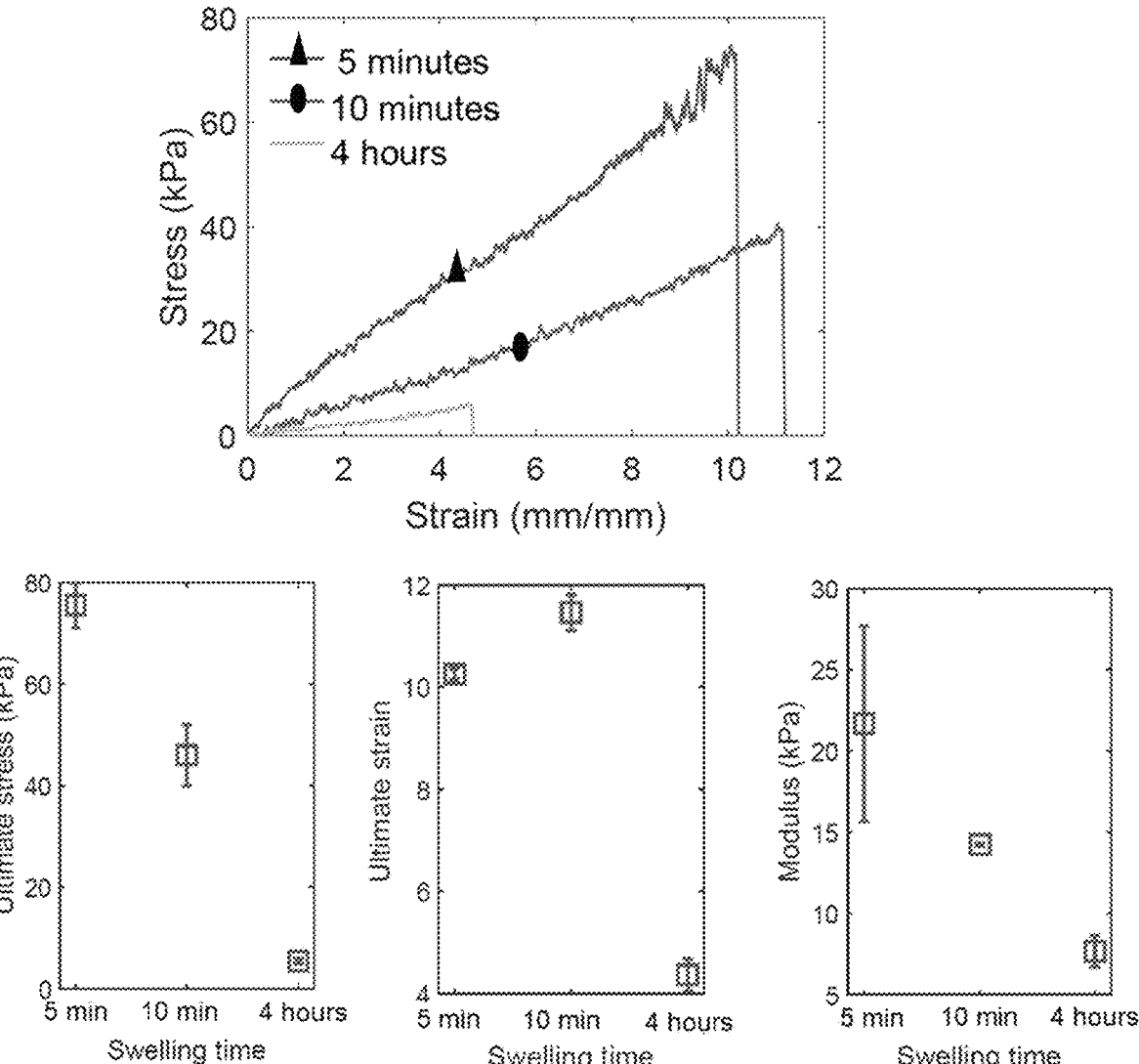

FIG. 10 is a series of stress-strain curves recorded from the hybrid gel structures swelled for 5 minutes, 10 minutes, and 4 hours. Ultimate stress, ultimate strain, and elastic moduli for the hybrid structures swelled for different time points. (Error bars: Mean±SD)

Figure 11:
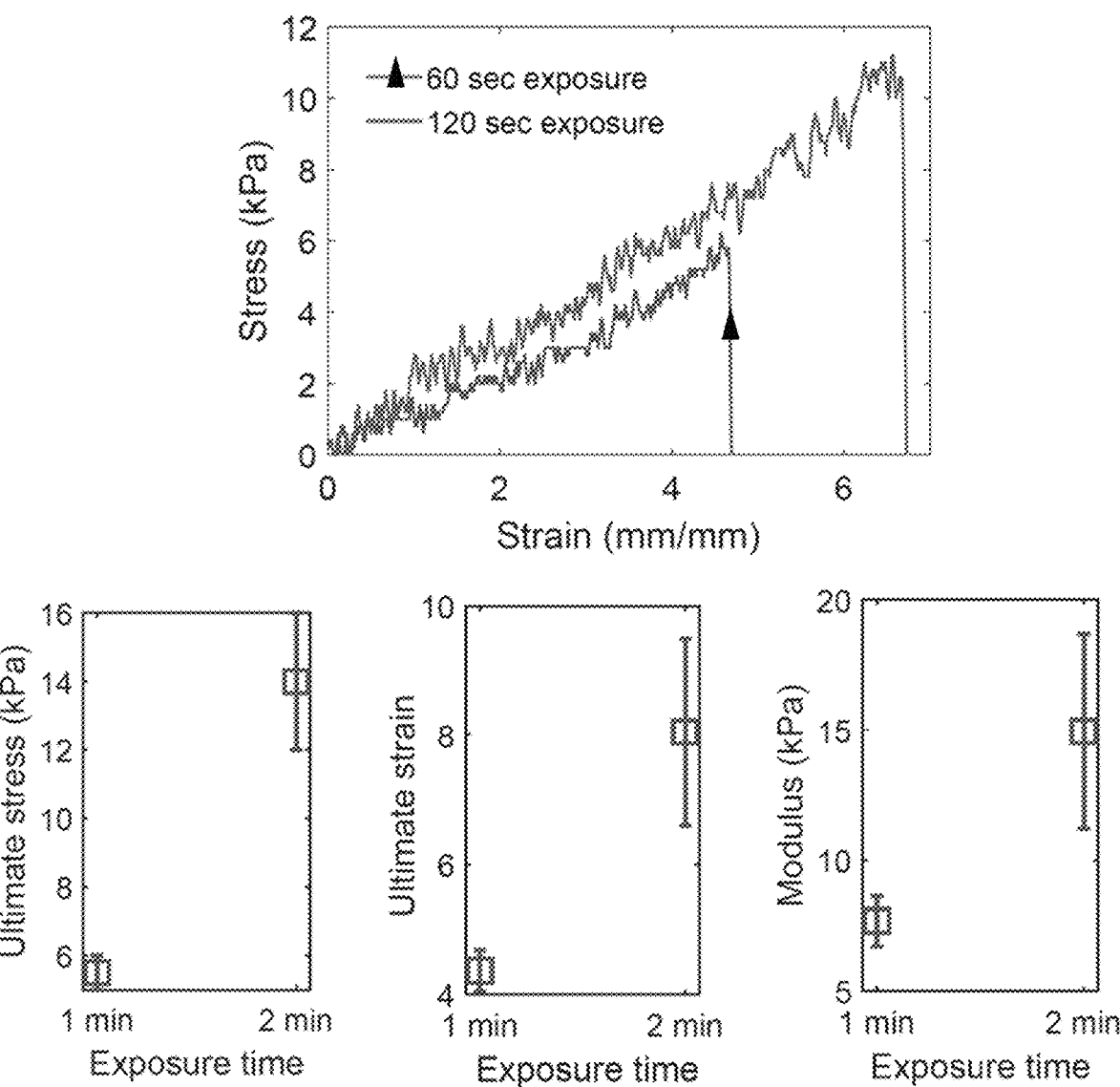

FIG. 11 is a series of stress-strain plots obtained from the swelled structures printed using different exposure times (60 seconds and 120 seconds). Structures were swelled for 4 hours in water. Ultimate stress, ultimate strain, and elastic moduli obtained from swelled structures printed using different exposure times.

Figure 12:
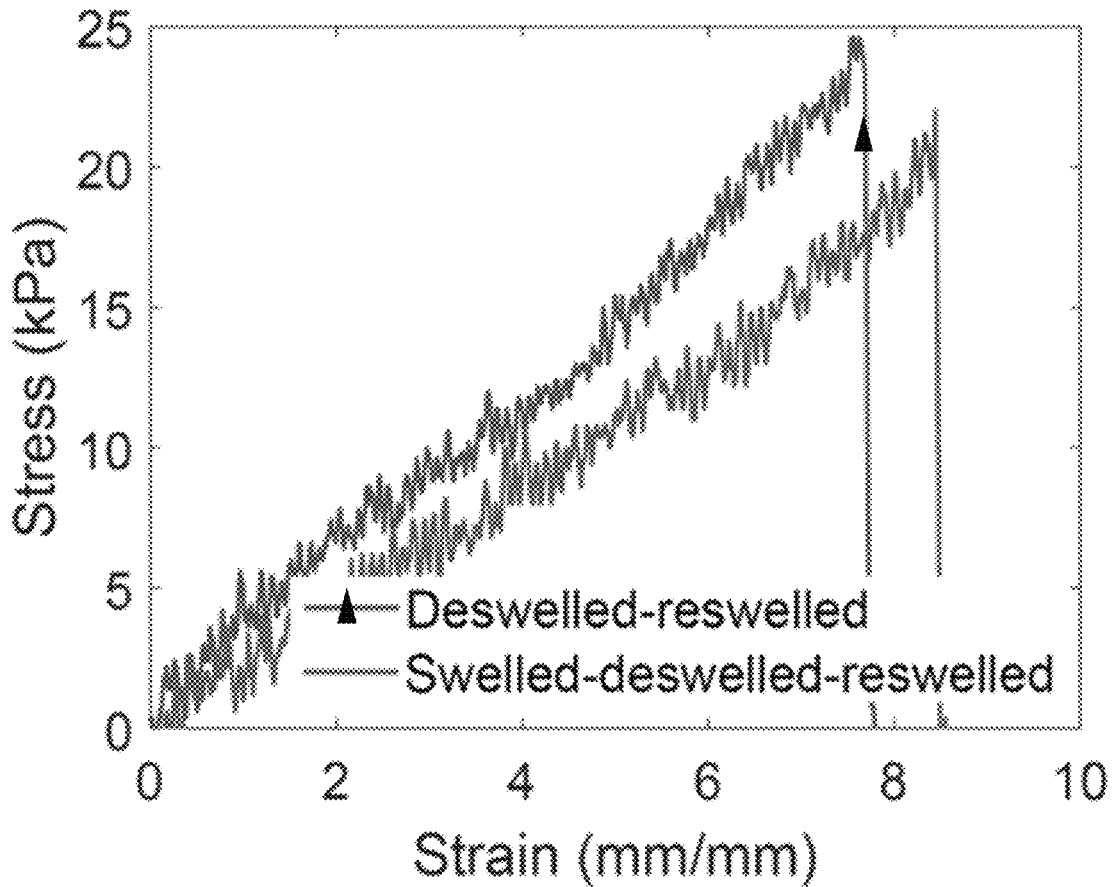

FIG. 12 is a series of stress-strain plots obtained from exemplary structures after different stages of swelling and deswelling. (Scale bar=5 mm).

Figure 13:
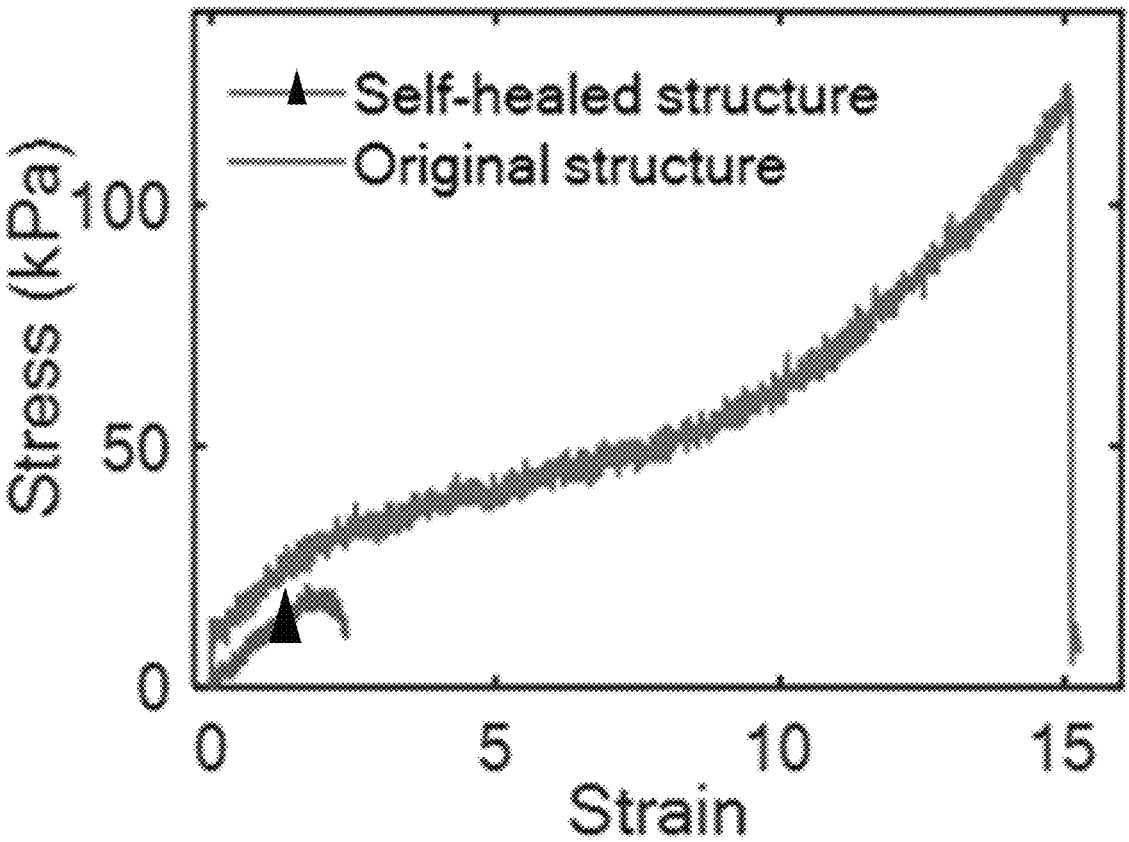

FIG. 13 is stress-strain plot comparing the tensile performance of a self-healed structure with that of the original structure.

Figure 14:
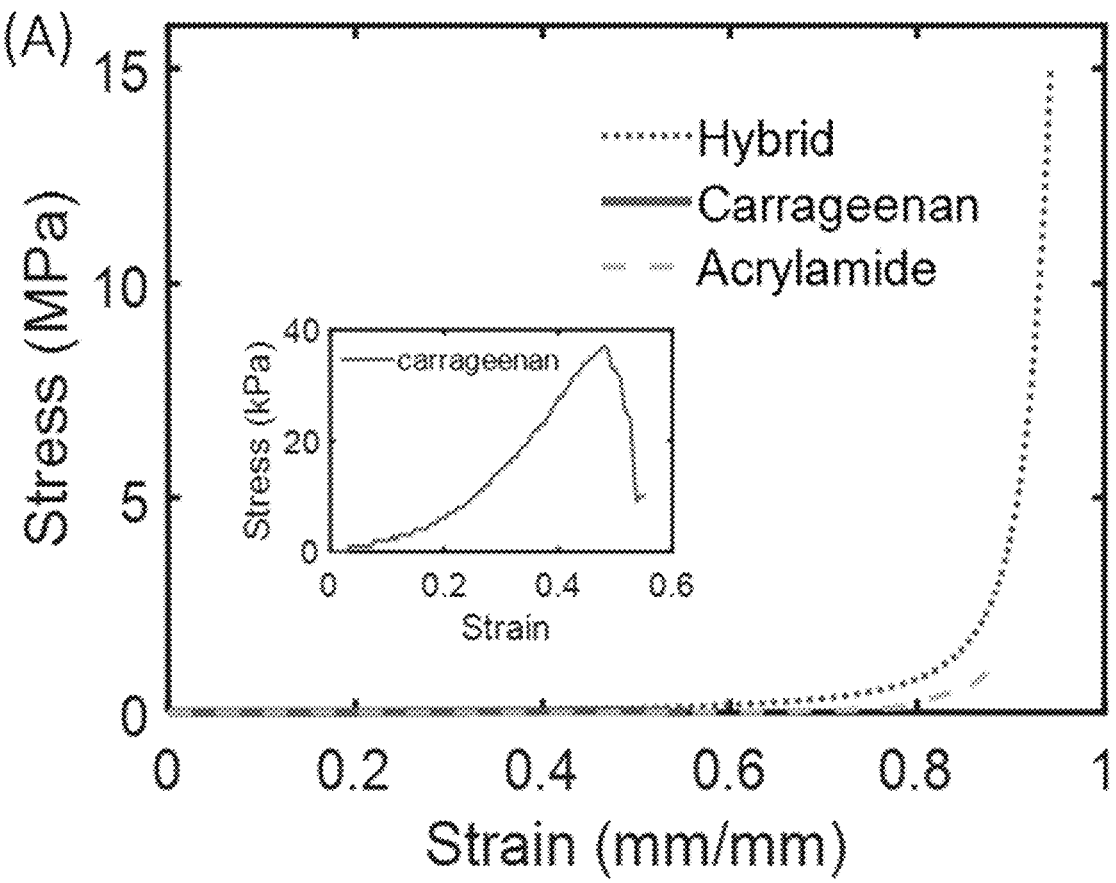
Figure 14:
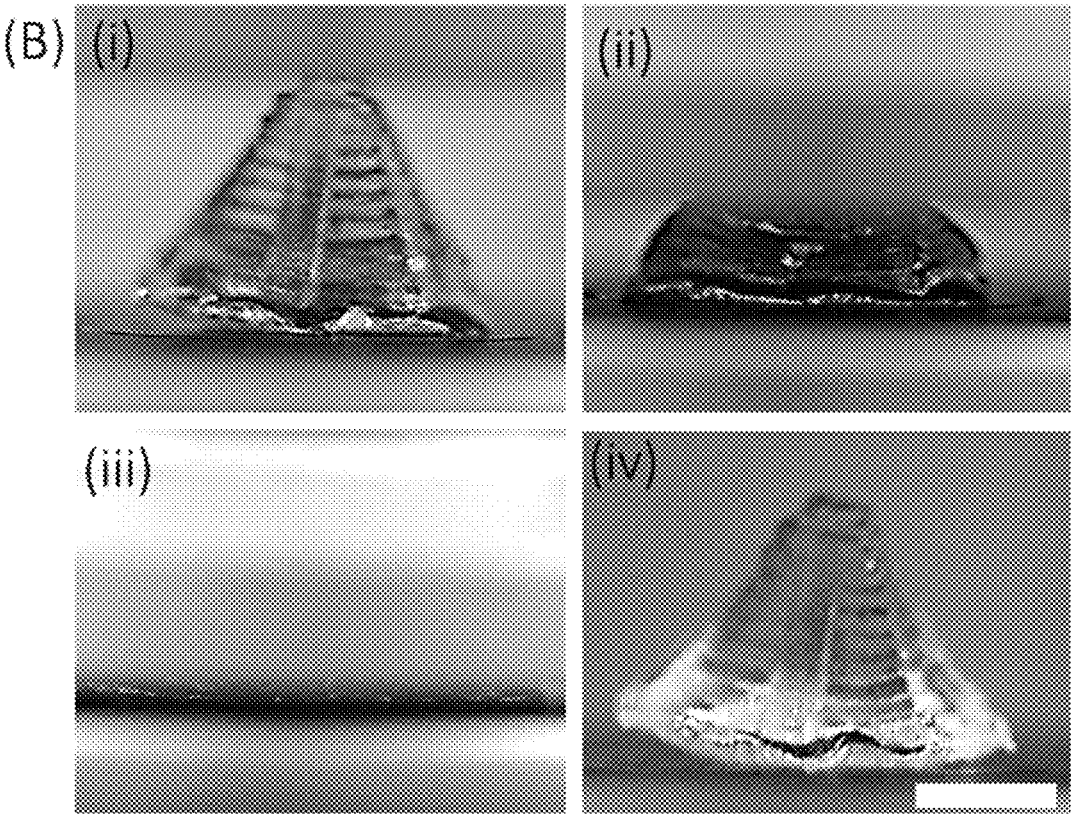
Figure 14:
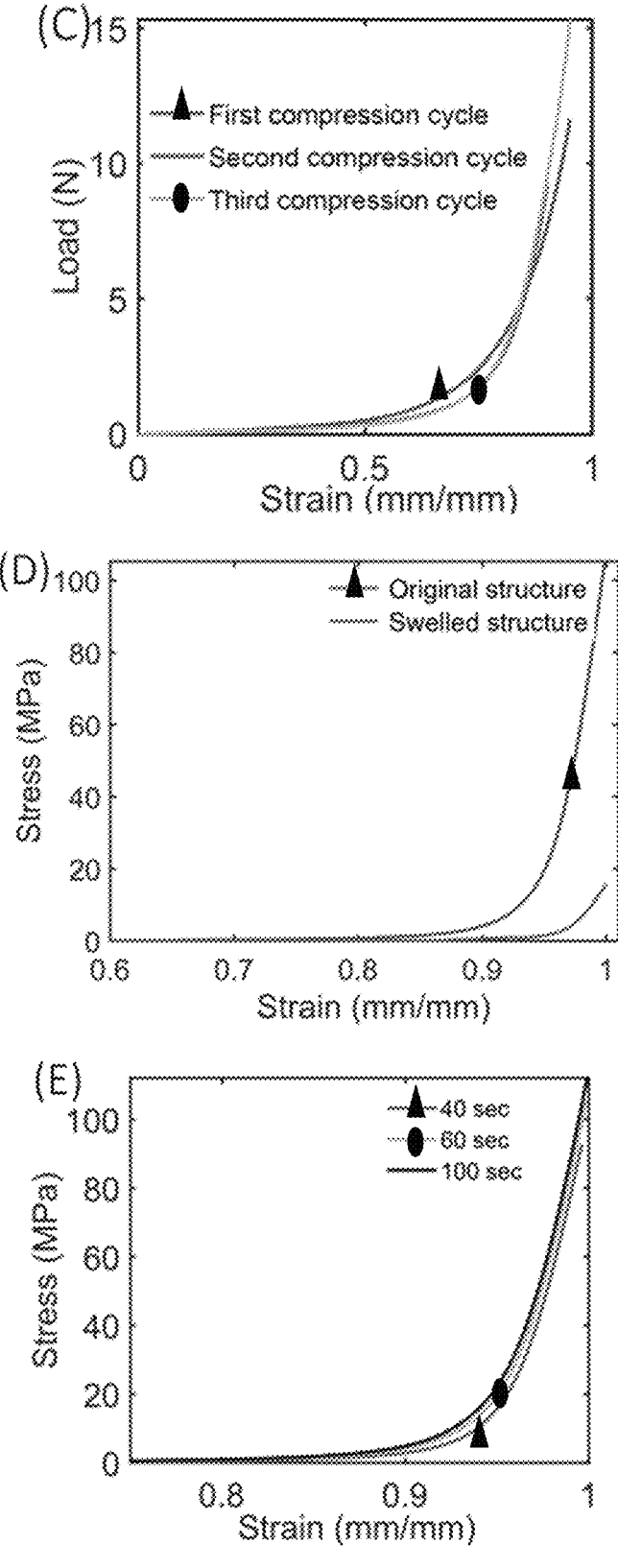

FIG. 14 is a series of panels of (A) Compressive Stress-strain plot obtained from a cylindrical stud structure printed using acrylamide-only, κ-carrageenan only, and acrylamide/κ-carrageenan hybrid gels. Inset shows a strain-stress plot of the κ-carrageenan structure. (B) Demonstration of compression and recoverability of 3D printed Mayan pyramid structure (Scale bar—5 mm). (C) Force-strain plot for 3 compression cycles of the pyramid structure. (D) Stress-strain plot was obtained by compressing the original structure and the structure swelled for 4 days. Inset shows original structure and swelled structure. (E) Stress-strain plot for DN gel structures printed by varying laser exposure time at fixed laser intensity. Inset shows the change in the modulus of structures printed using different exposure times.

Figure 15:
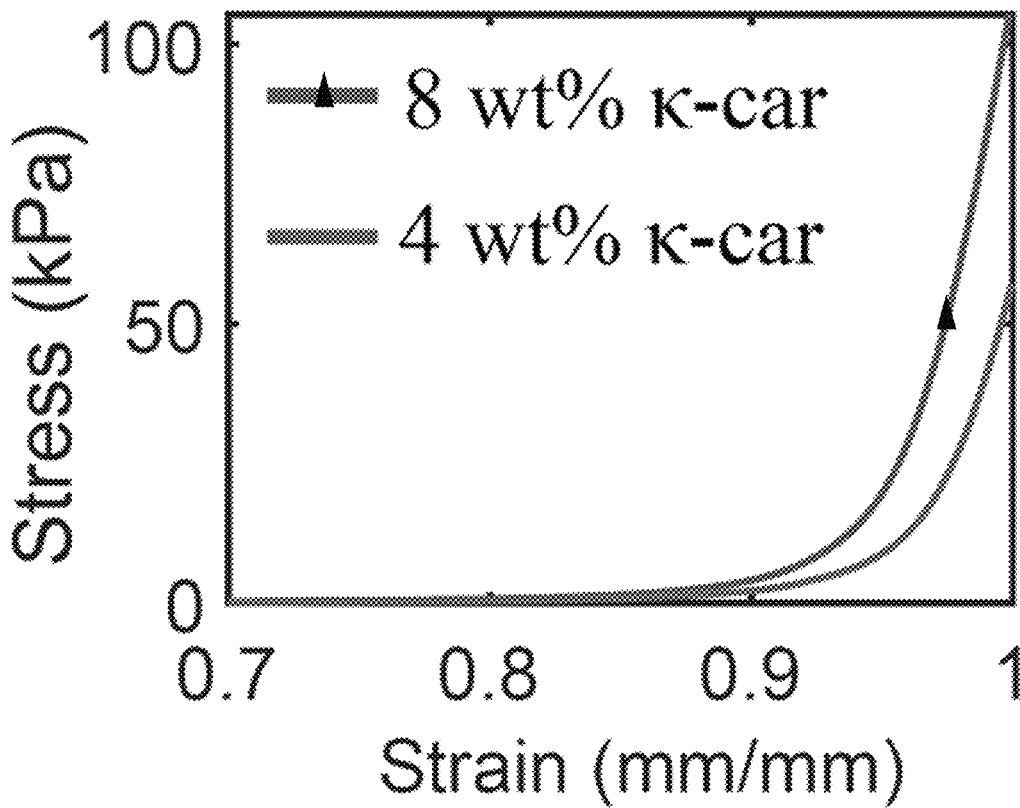

FIG. 15 is a compressive stress-strain plot for structures printed using two different concentrations (4 wt % and 8 wt % with respect to acrylamide) of κ-carrageenan in the hybrid gel.

Figure 16:
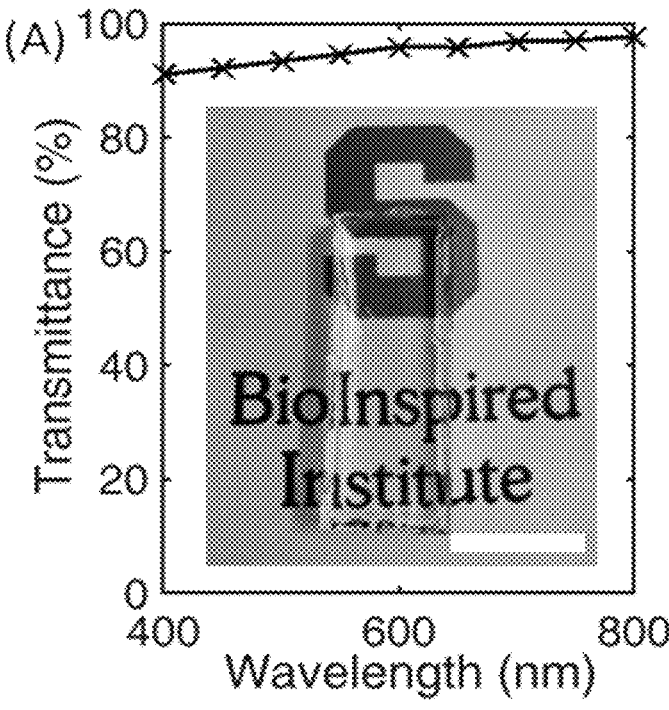
Figure 16:
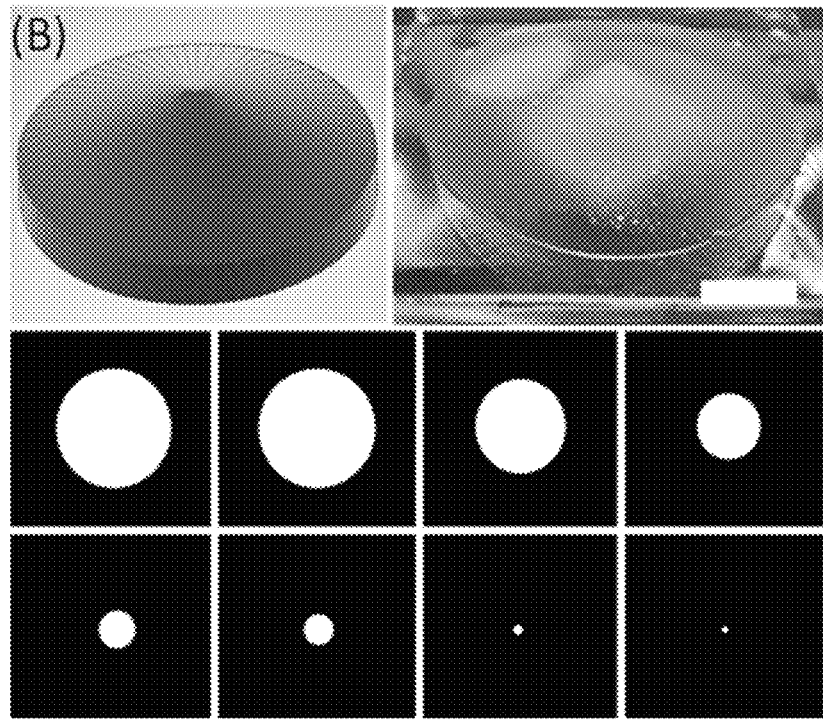
Figure 16:
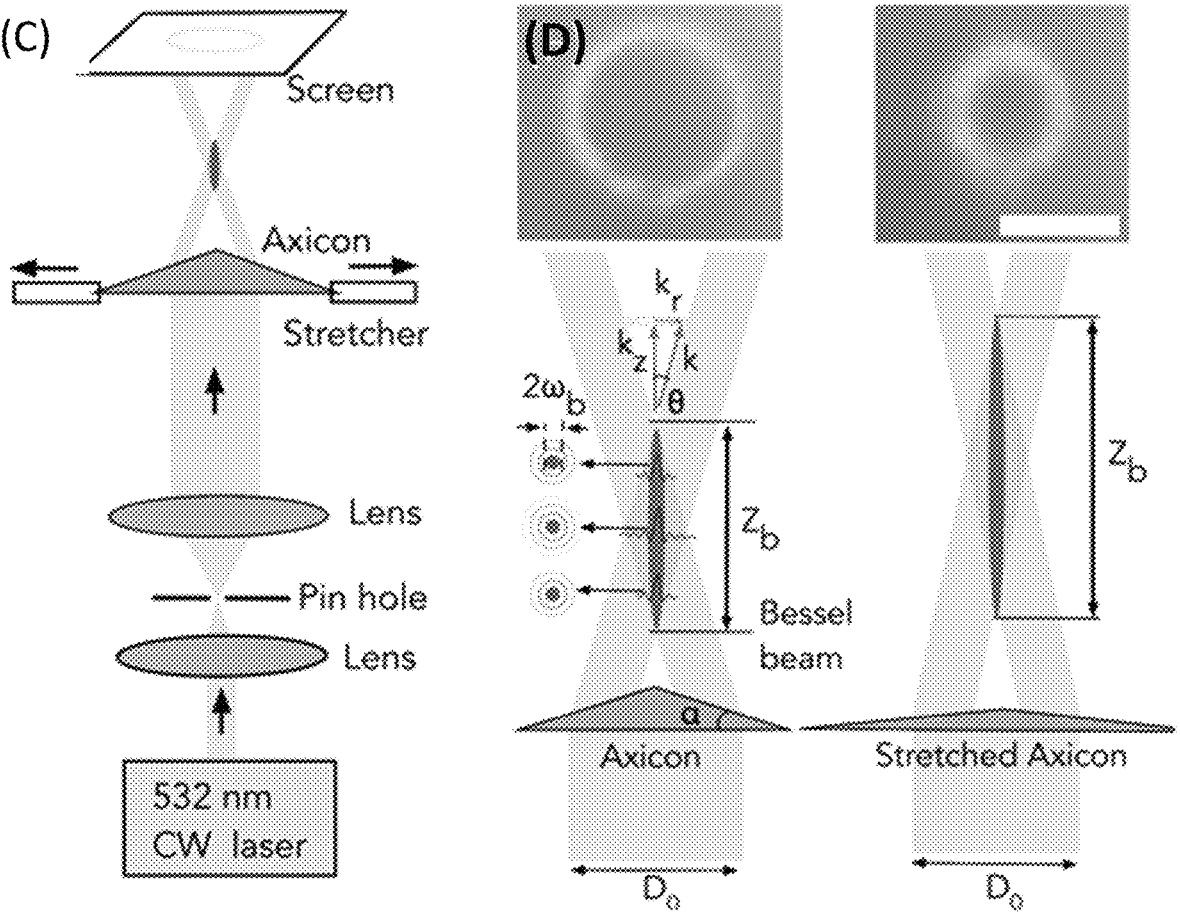

FIG. 16 is a series of panels of (A) Transmission spectra of structure printed using DN gel structure. The printed structure is placed on the top of the Bioinspired Institute logo to demonstrate the high transmissivity of the DN gel structure. (B) CAD design, computer-generated digital mask, and 3D printed axicon lens using TOPS. (C) Optical setup to characterize the annular ring of the axicon lens during dynamic tuning. (D) Schematic showing the zero-order Bessel beam generation by the axicon and experimentally obtained annular rings before and after stretching the axicon lens.

Figure 17:
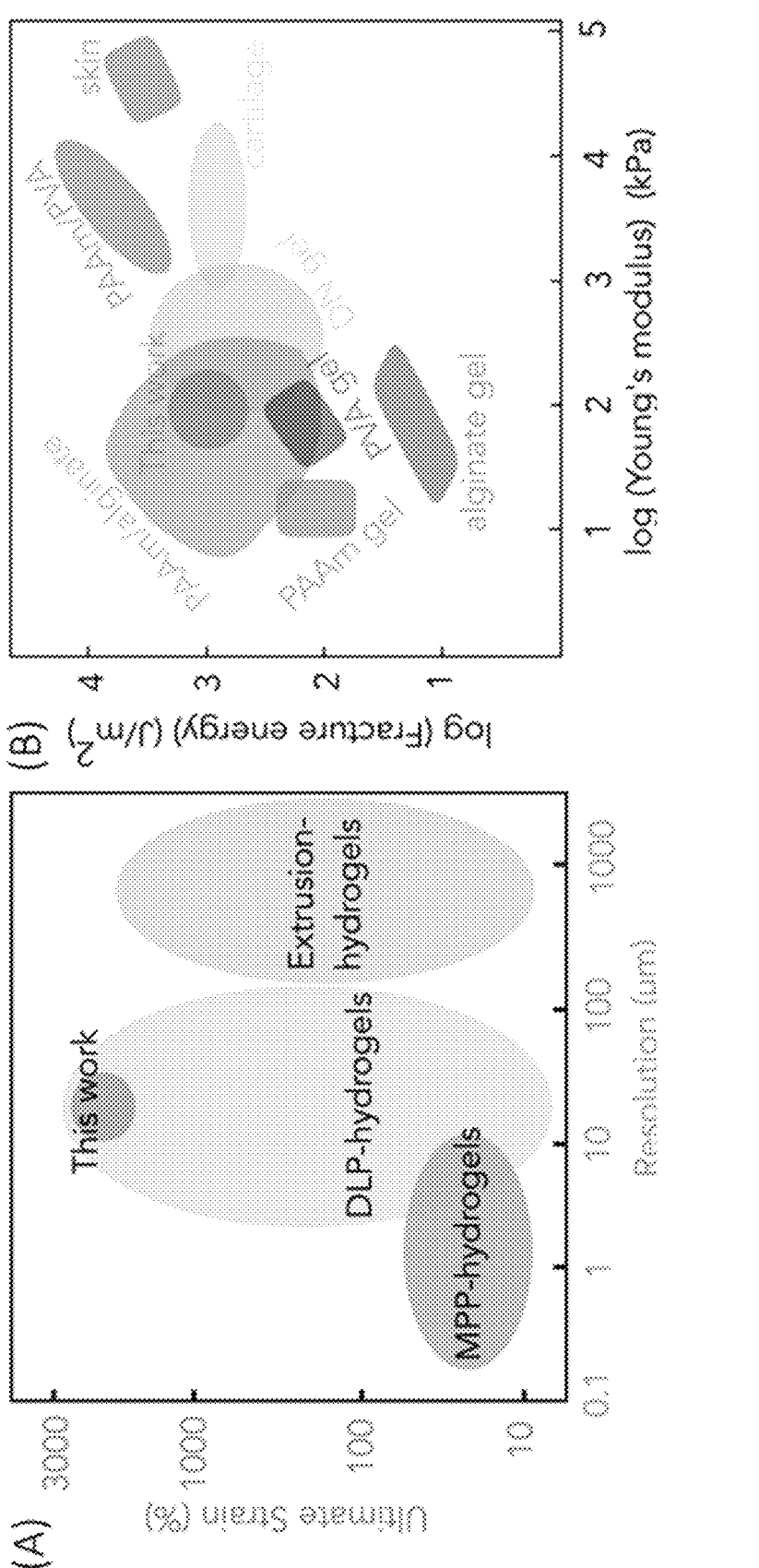
Figure 17:
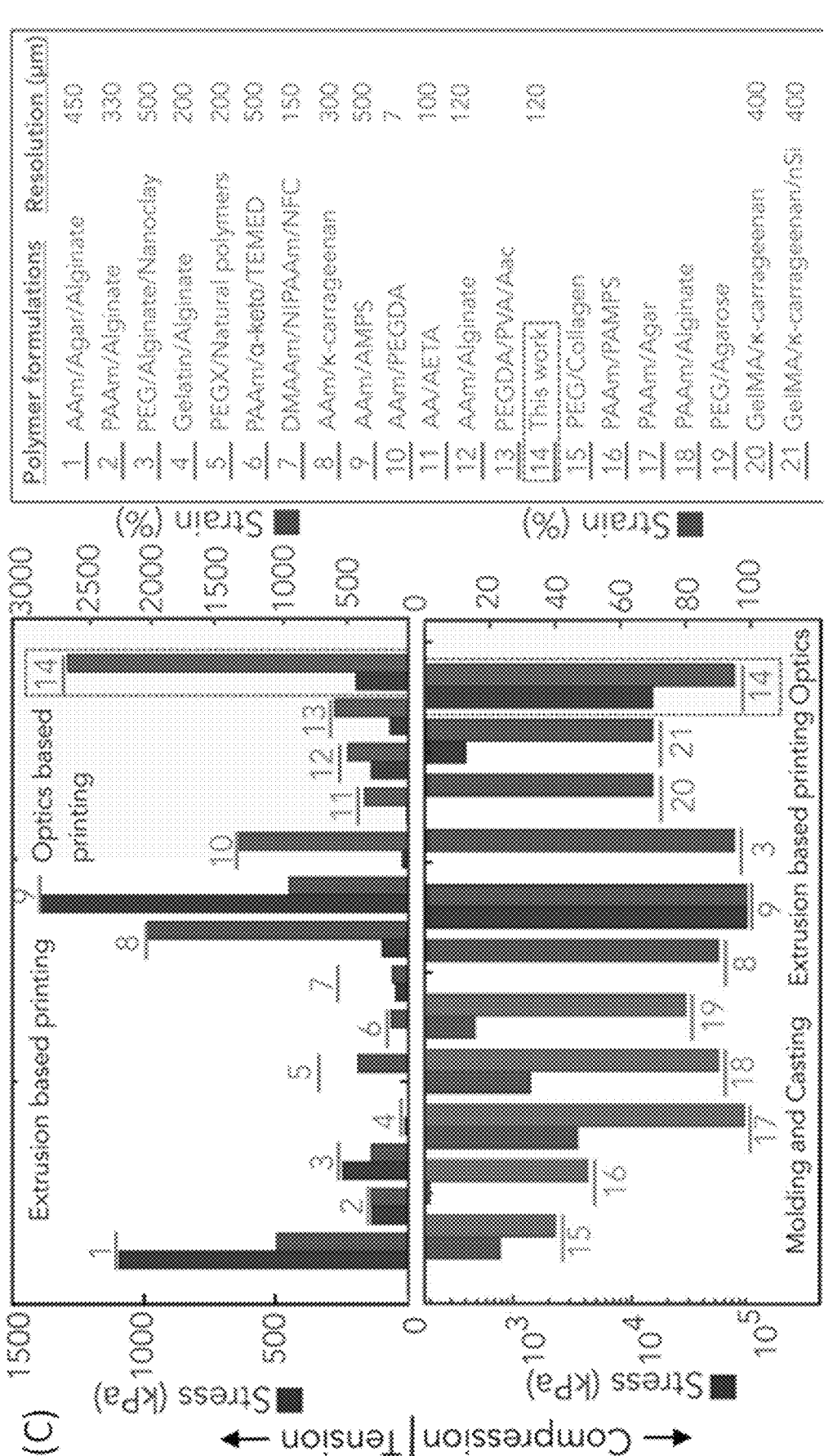

FIG. 17 is a series of graphs of (A) Comparison of performance of TOPS printed acrylamide/κ-carrageenan structures with existing technology of hydrogel fabrication in terms of resolution and ultimate strain. (B) Comparison of performance of TOPS printed acrylamide/κ-carrageenan structures with hydrogels and double network hydrogels in terms of fracture energy and Young's modulus. (C) Plot depicting the comparison of printing performance (in terms of resolution) and mechanical performance (in terms of strain and strain) of TOPS printed acrylamide/κ-carrageenan structures with other 3D printed DN hydrogels.

Figure 18:
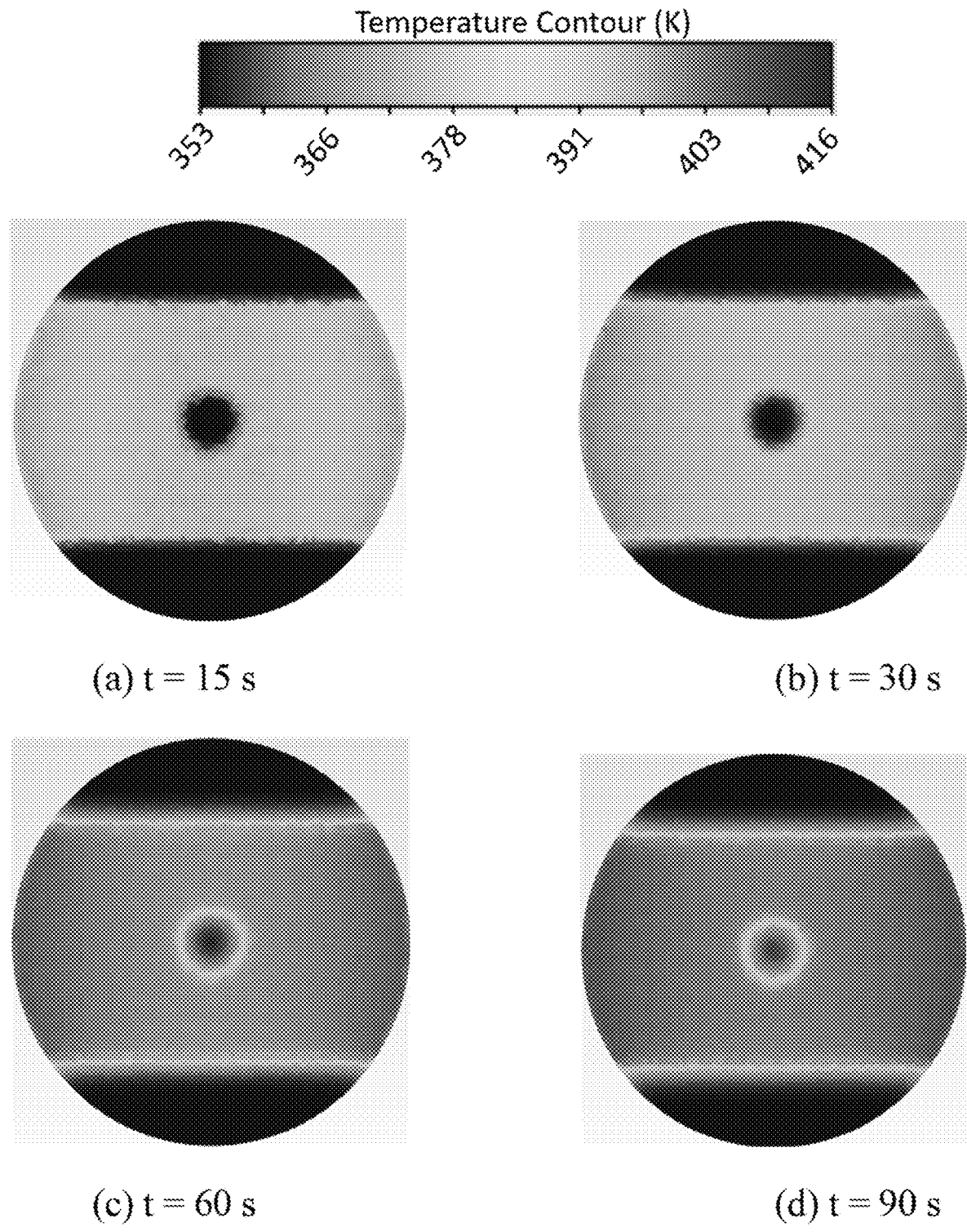

FIG. 18 is a series of graphics of the temporal evolution of temperature distribution over the PDMS layer heated using the copper heater. The plots are obtained from the simulation using an optimum mesh of 240,000 grid points.

DETAILED DESCRIPTION

Figure 1:
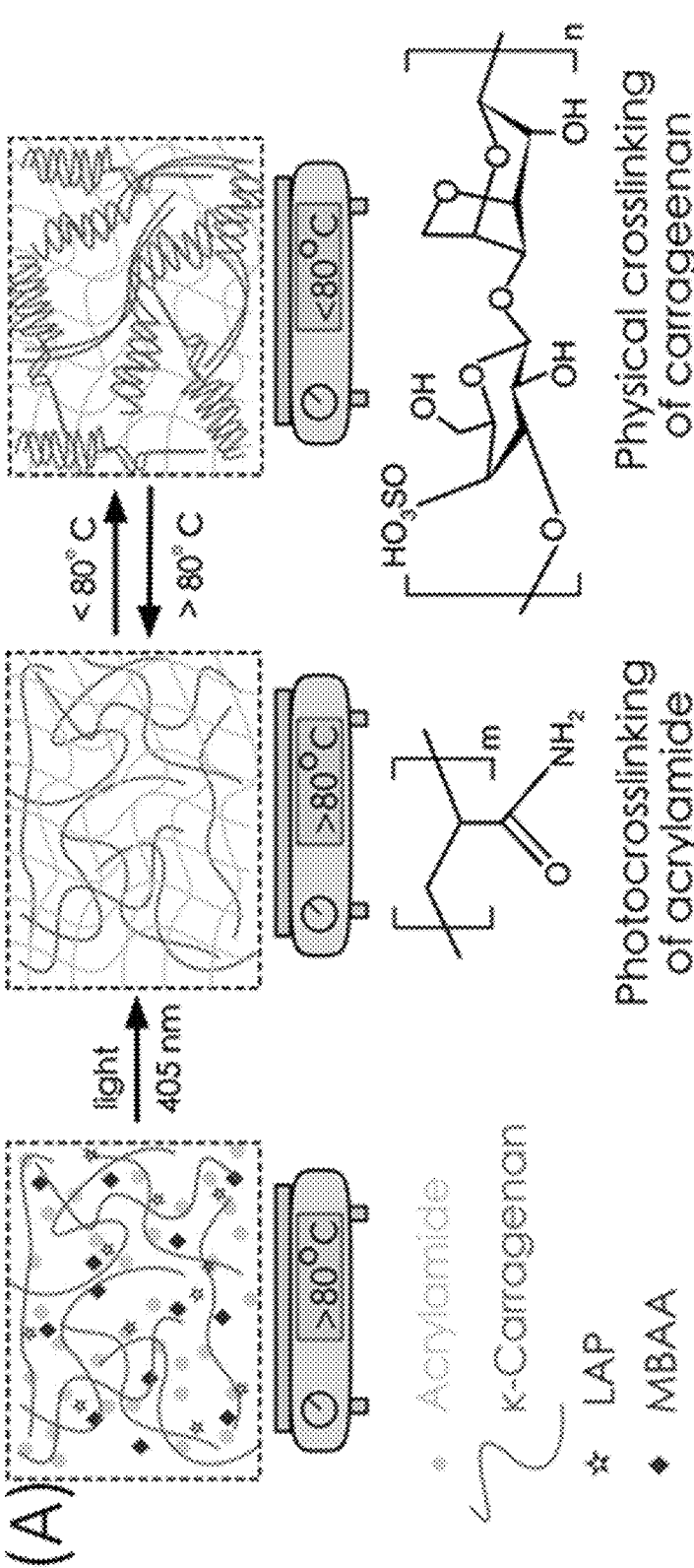
Figure 1:
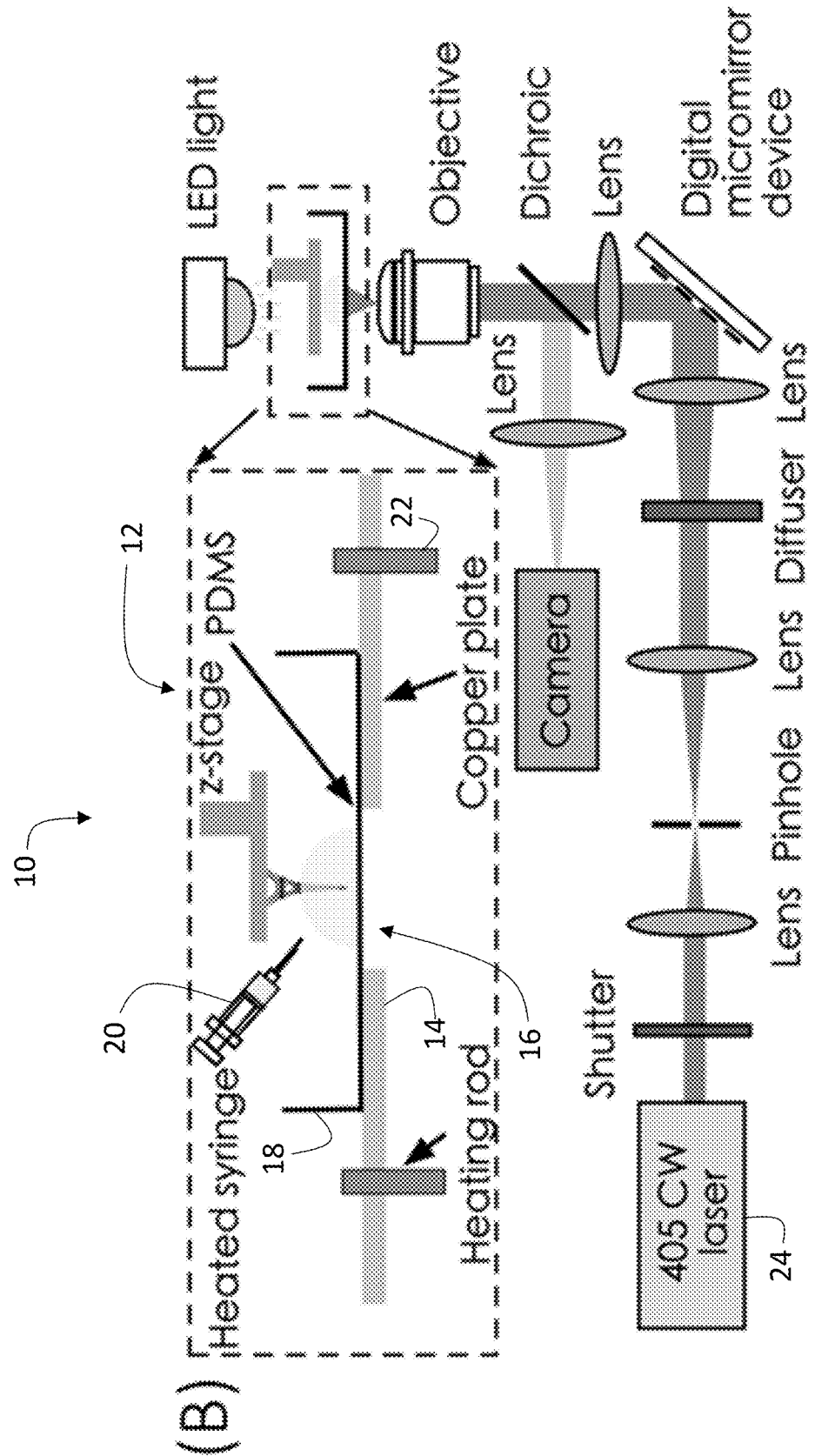
Figure 1:
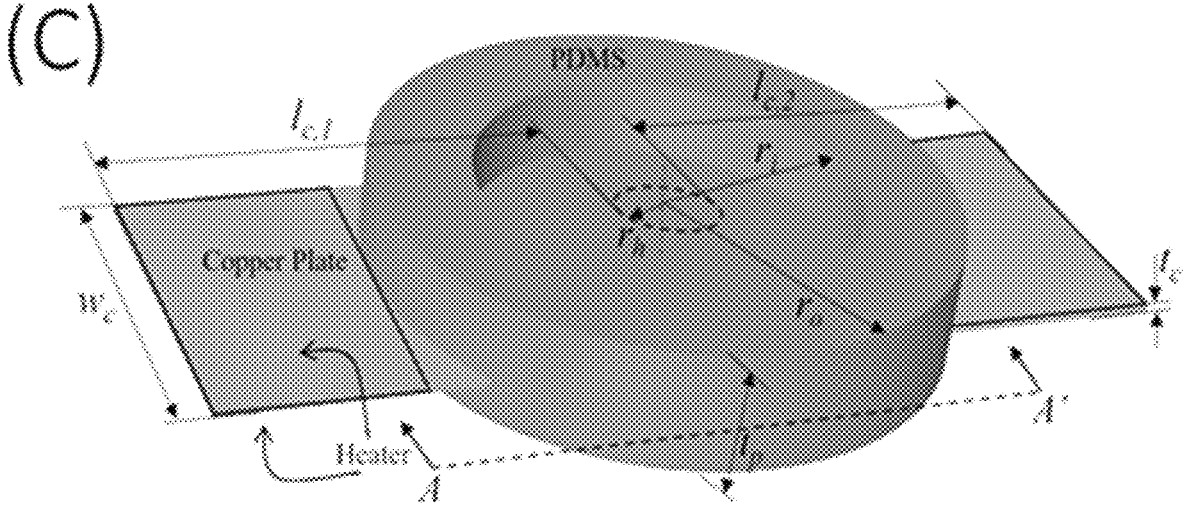
Figure 1:
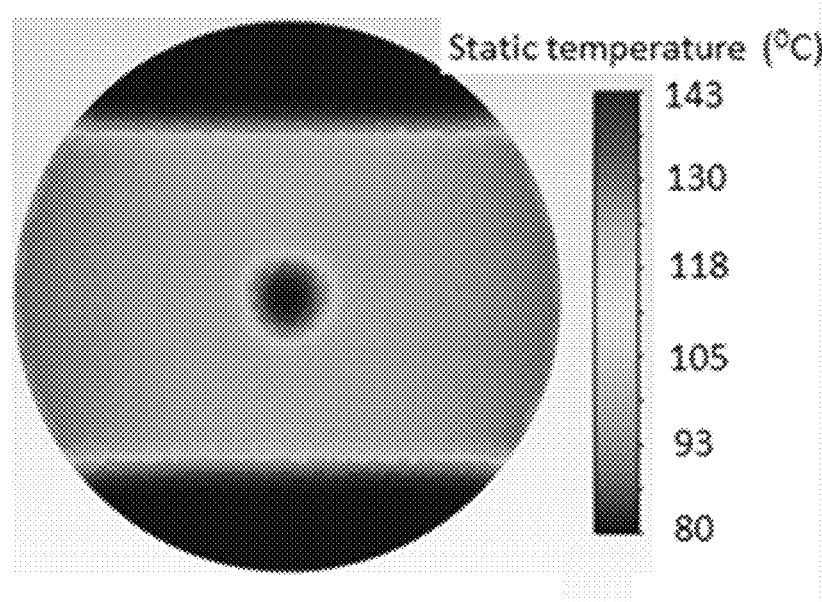

Referring to the figures, wherein like numerals refer to like parts throughout, there is seen in FIG. 1, a TOPS apparatus and method for one-pot PSLA printing of three-dimensional structures from double network (DN) hydrogels that combines the advantages of PSLA (rapid, high-resolution, 3D design flexibility) and hydrogels (transparency, hydration) to shape DN gels into complex geometries with superior mechanical properties, i.e., high strength in both tension and compression.

An exemplary single pot DN hydrogel prepolymer solution comprises acrylamide monomers, κ-carrageenan, crosslinker MBAA, LAP photoinitiator, and in some cases photoabsorber. The basic mechanism of DN formation involves photo-crosslinking of the acrylamide network and physical crosslinking of κ-carrageenan below its sol-gel transition temperature (80° C.) (FIG. 1A). Thus, a new stage was designed and built to allow the printing of the prepolymer formulation above 80° C. Below 80° C., prepolymer physically crosslinks into a viscous gel and cannot be printed using PSLA. TOPS setup consists of a light source, diffuser, DMD, projection optics, z-stage, and specially designed sample holder for maintaining a constant elevated temperature. (FIG. 1B). The design of the sample holder consisted of a copper plate with a center hole embedded inside the PDMS bath. The 16 mm hole serves as the fabrication window and the copper plate heats the sample holder. A multistep molding and casting technique was used to build the sample holder.

Referring to FIG. 1B, an apparatus 10 for use with the present invention includes a sample holder 12 including metal plate 14, such as a copper plate, having a fabrication hole 16 formed therethrough and a transparent dish 18 positioned on top of metal plate 14. A source of the formulation 20, shown as a heated syringe, includes a set of components that can form a first layer of a double network hydrogel (such as a photo-crosslinked prepolymer and a physical crosslinked prepolymer having a transition temperature) is used to supply the formulation to dish 18 on metal plate 14, which is maintained above the transition temperature of the first component of the double network hydrogel by a source of heat 22 coupled to the metal plate 14. A source of modulated irradiation 24, shown as a laser along with accompanying optical elements and a digital micromirror device, is positioned below metal plate 14 and aligned with fabrication hole 16 to deliver a spatially modulated pattern of light through said fabrication hole 16 to selectively polymerize the second component of said double network hydrogel.

Computational fluid dynamics (CFD) simulation provided the temperature distribution to guide the design of the sample holder (FIG. 1C). The temperature within the fabrication window was experimentally measured to be 80° C. when the heaters were operated at 150° C. (423 K). DN hydrogel structures were printed using PSLA at 80° C. as explained below. Based on user-defined CAD design, spatially modulated light patterns are irradiated onto the liquid prepolymer solution maintained at an elevated temperature. Upon irradiation, the LAP photoinitiator absorbs light and initiates a polymerization reaction in the presence of a crosslinker (MBAA) to form a polyacrylamide network that locks-in place target geometry followed by cooling-driven physical crosslinking of the x-carrageenan network resulting in a DN hydrogel structure. For each layer, prepolymer solution was injected via a heated syringe into the fabrication window area, and post-printed samples were developed in hot DI water (at 80° C.) for 2 mins to remove any uncrosslinked monomers.

Figure 2:
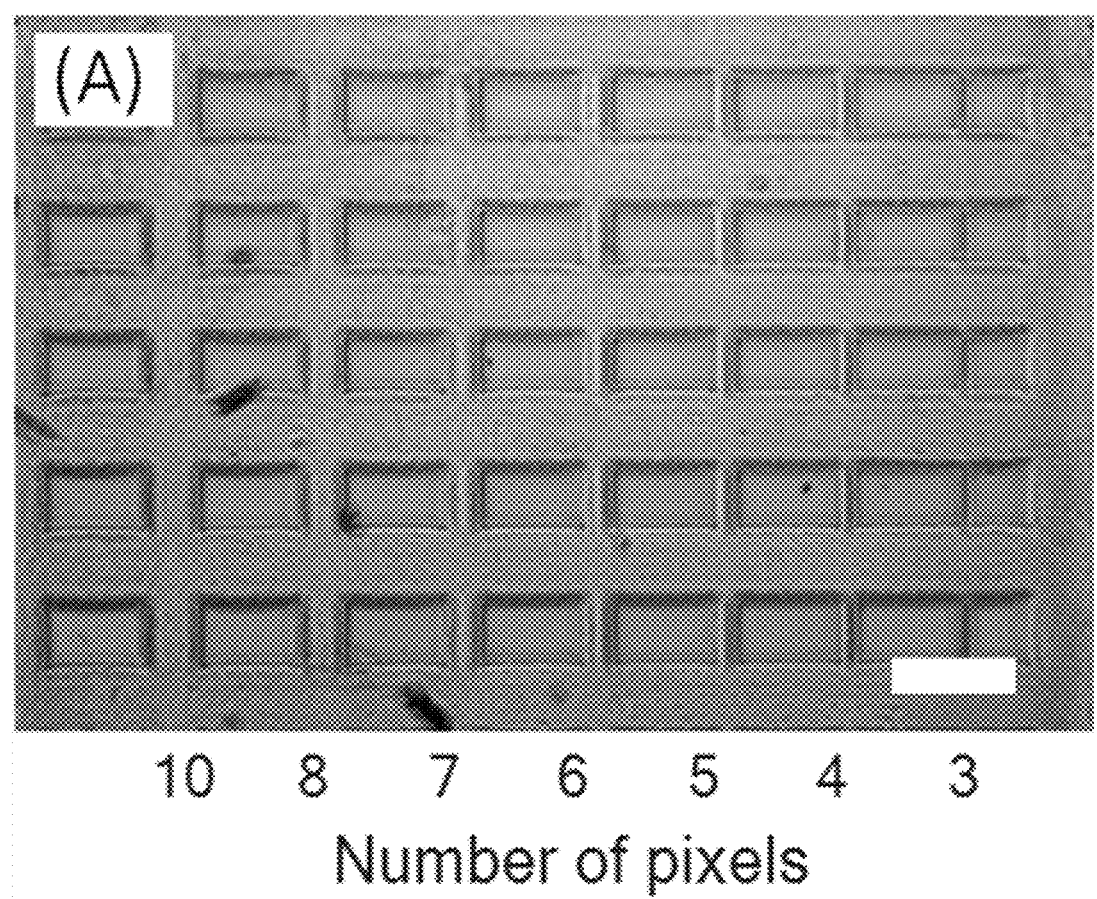
Figure 2:
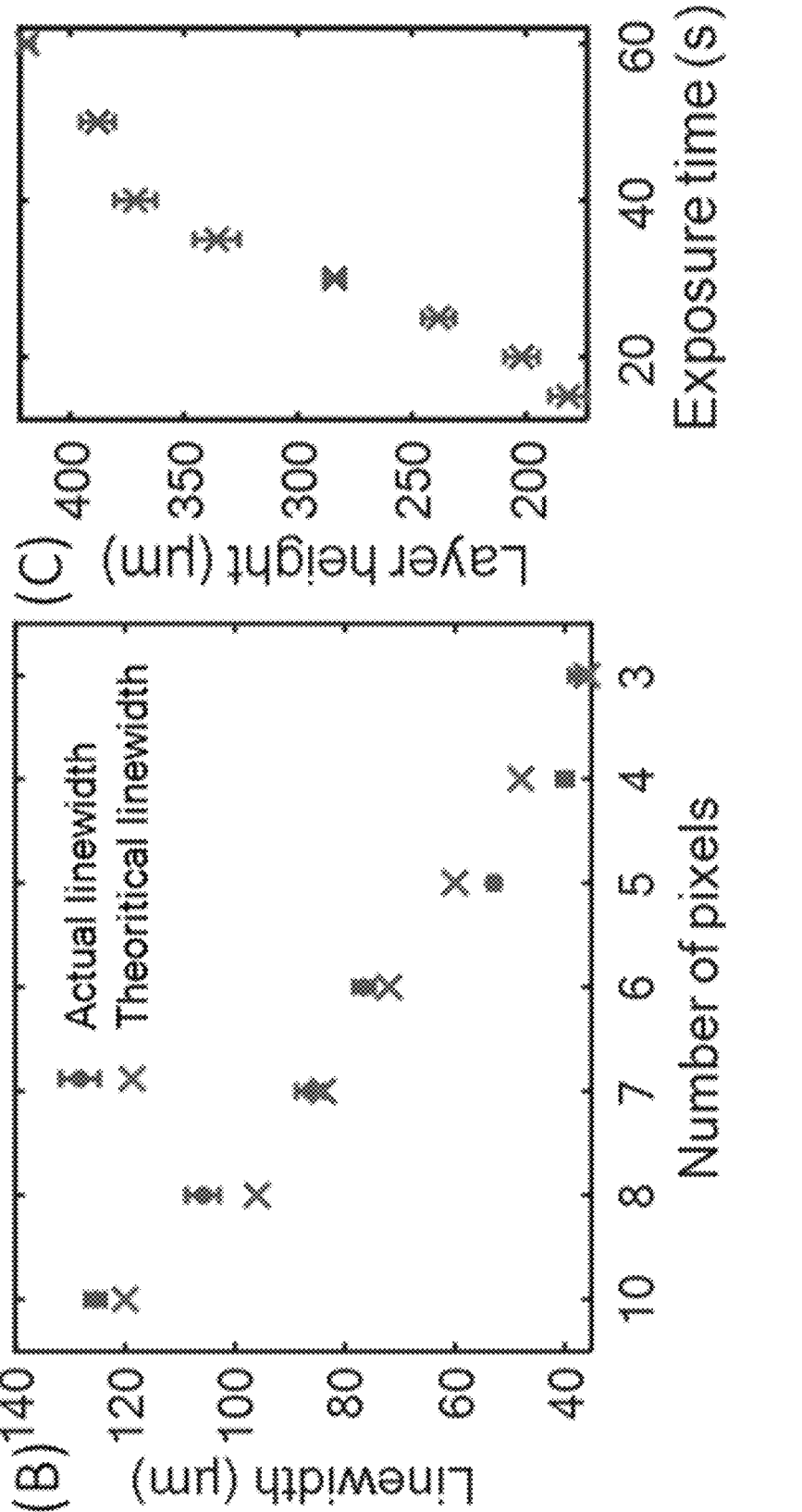
Figure 2:
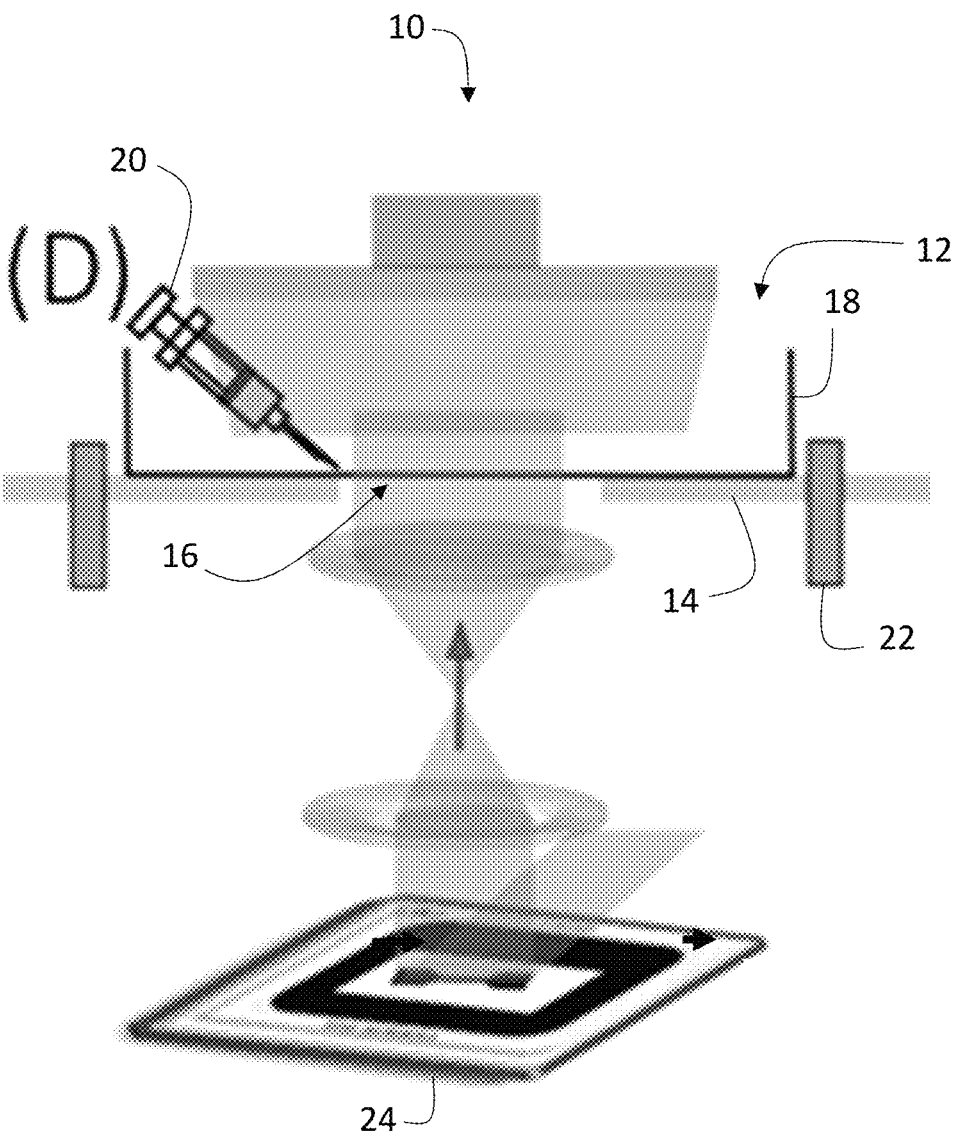
Figure 2:
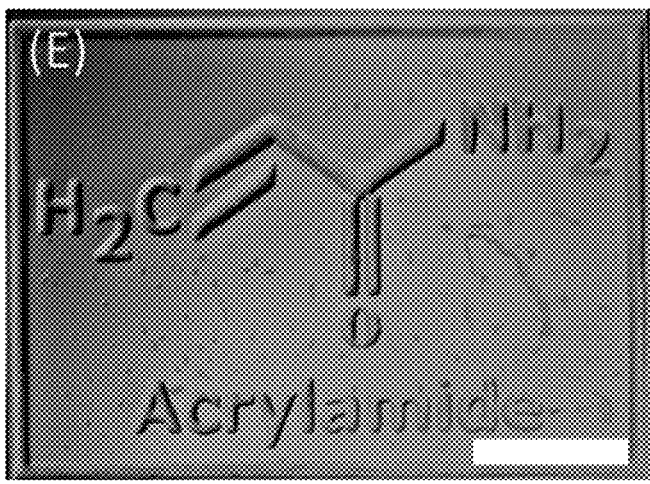
Figure 2:
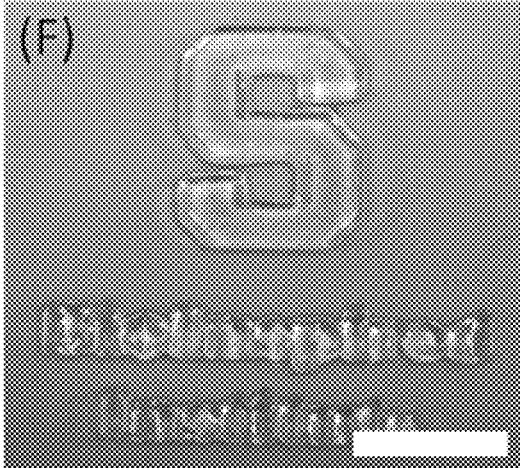
Figure 2:
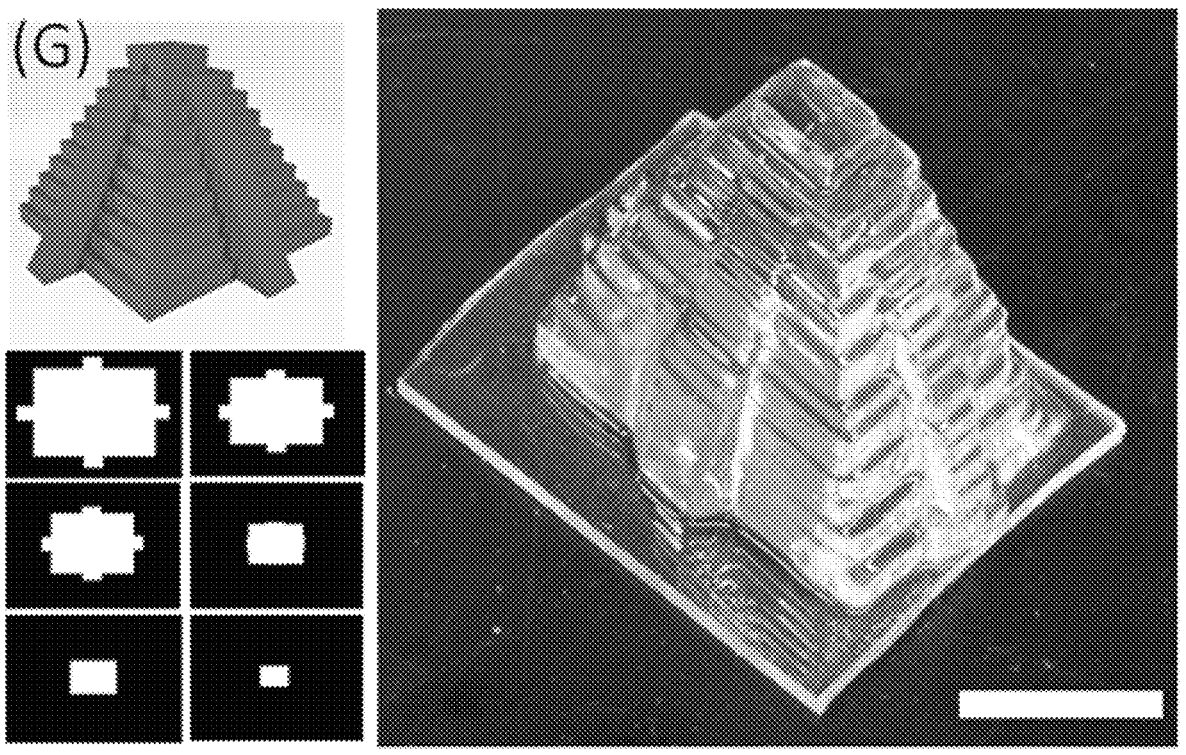
Figure 2:
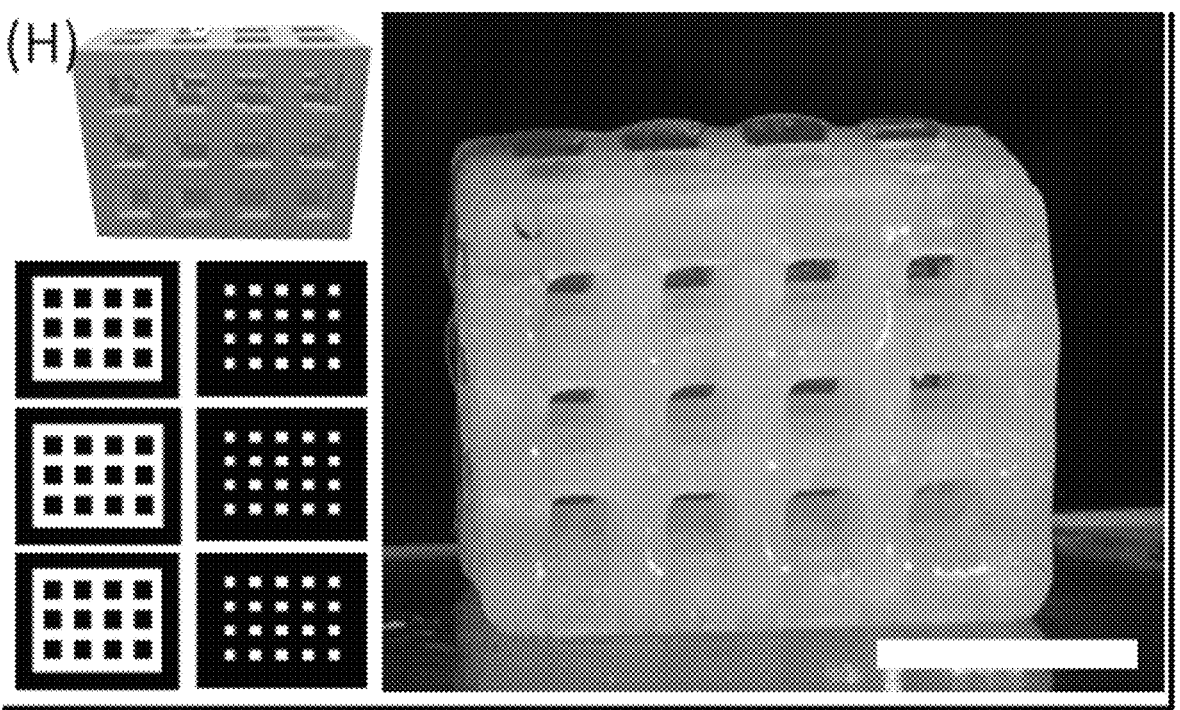

Printing 2D, 3D Solid, and 3D Hollow DN Structures at Microscale Resolution Using TOPS Before printing complex, 2D/3D structures using DN hydrogels, both lateral and vertical resolution limits were characterized. For quantifying the lateral resolution of TOPS, digital masks of intersecting line patterns with varying pixels (1-10) were printed using a laser intensity of 2.17 mW/cm² and an exposure time of 15 seconds. Measured line widths were close to the theoretical resolution, which corresponds to the micromirror size in the Digital Micromirror Device (DMD) chip in PSLA (FIG. 2A-B). For instance, the smallest feature size of 37 μm was experimentally obtained for a 3-pixel line pattern, close to the theoretical resolution of 36 μm. The vertical printing resolution, necessary to generate structures with internal voids, was characterized by adding a photo-absorber (tartrazine, 0.006 wt %) to the prepolymer solution. The curing depth was optimized by varying the exposure dose, a function of light intensity and time. Here, a rectangular slab was printed on the coverslip by varying the exposure time while maintaining a constant laser intensity of 2.4 mW/cm². The thickness of the structures was measured to obtain the curing depth and plotted as a function of exposure time (FIG. 2C). A z-resolution of 180 μm was obtained for the exposure time of 15 seconds. The curing depth can be tuned from 180 μm to 420 μm by varying the exposure time from 15 to 60 seconds. Exposure time below 15 seconds did not result in crosslinking of the DN gel structure.

Results show a 2D pattern of the chemical structure of "acrylamide" and the logo of the Bioinspired Institute of Syracuse University (FIG. 2D-F). Next, a solid 3D geometry in the form of a Mayan pyramid was printed with a laser intensity of 2.17 mW/cm² and a layer exposure time of 15 seconds (FIG. 2G). Lastly, hollow 3D geometry with overhangs and undercuts was chosen and printed (FIG. 2H). Here, a 0.006 wt % tartrazine photo absorber was added to the prepolymer solution before printing the geometry (2.4 mW/cm², exposure time per layer=15 seconds). All printed structures were developed in water (80° C. for 2 minutes) to remove uncrosslinked monomers.

Tensile Performance of Printed DN Gels Structures

Figure 3:
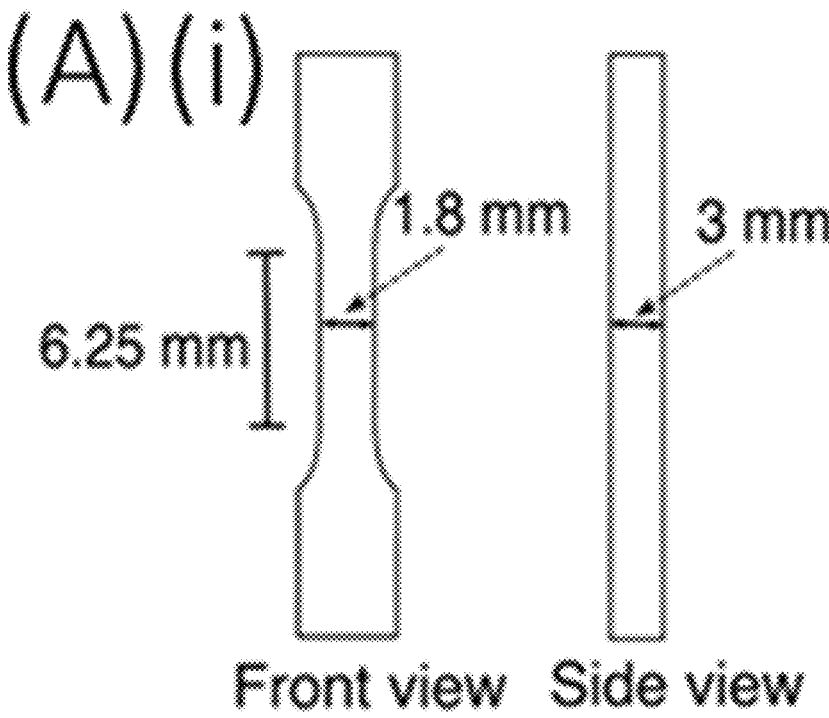
Figure 3:
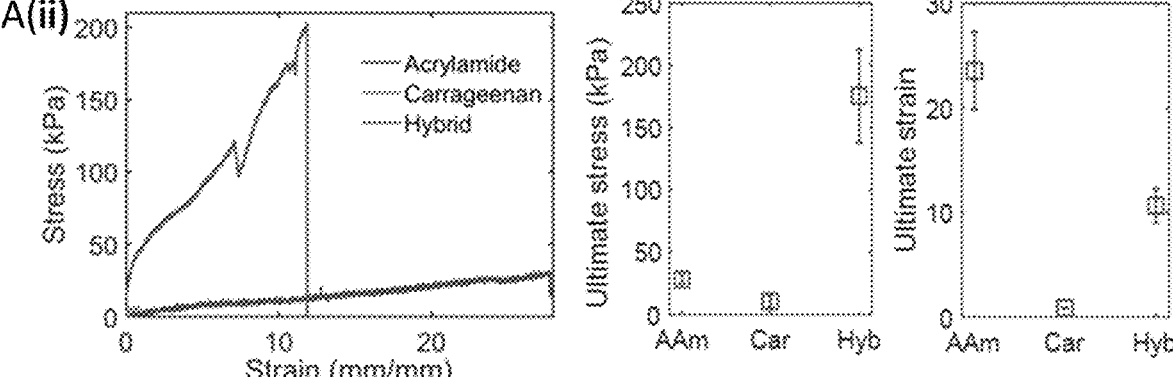
Figure 3:
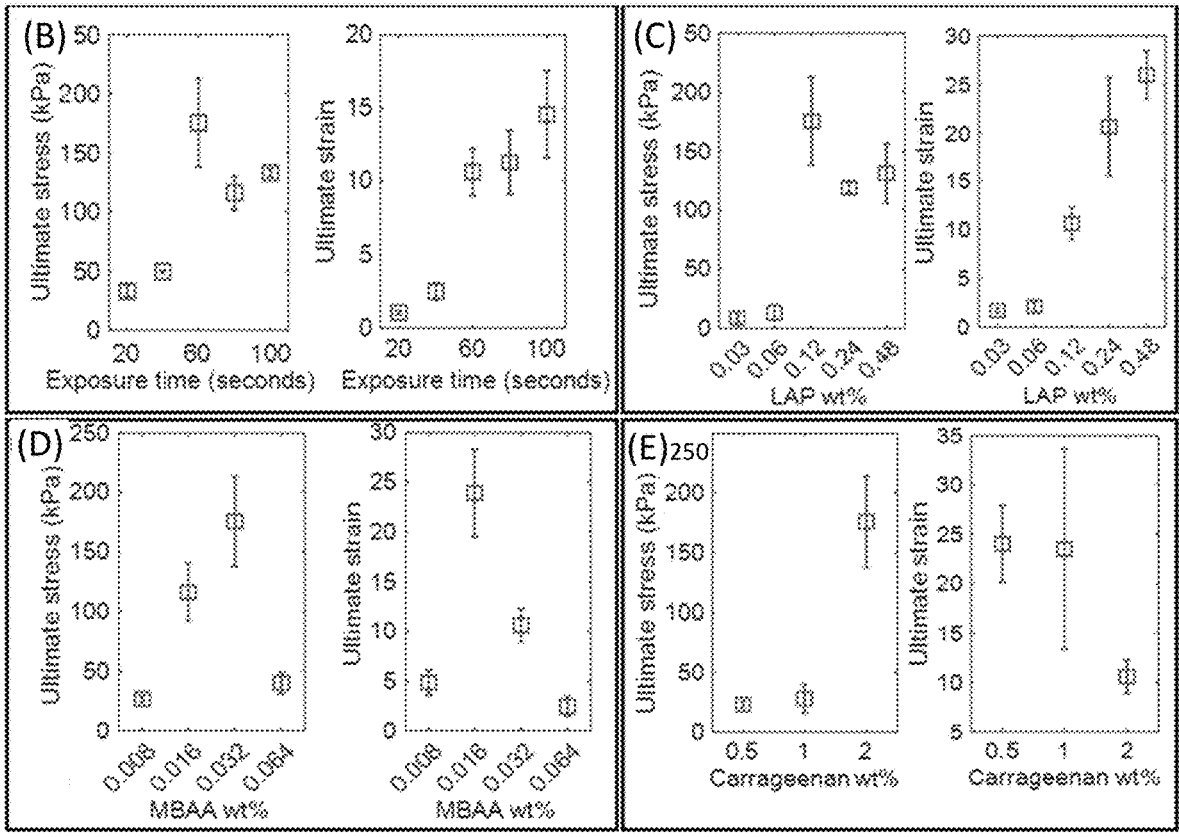

Tensile properties of TOPS-printed DN dog-bone shaped structures (FIG. 3A(i), Video V1) were compared with identical structures made from single-network structures (acrylamide-only, κ-carrageenan only). Acrylamide-only dog-bone structures were printed with TOPS (2.17 mW/cm²) using single exposure while conventional molding and casting was used to generate dog-bone geometry using κ-carrageenan. The representative stress-strain plot shows the superior fracture energy (1238.1 J/m²) of DN structures as compared to single-networked acrylamide (425.9 J/m²) and κ-carrageenan (4.25 J/m²) structures (FIG. 3A(iii)). The ultimate stress required to stretch the hybrid gel structure by 10.6±1.64 times was 175±37 kPa, whereas the stress and associated ultimate strain for acrylamide gels were 28±3.6 kPa and 23.5±3.7 kPa (FIG. 3A (iii)). The κ-carrageenan structure breaks at the strain of 0.8±0.06 at the stress of 10.5±4.9 kPa ((FIG. 3A (iii))). The modulus of elasticity is 79.5±22 kPa highest for hybrid gel whereas it was 8.2±0.72 kPa for acrylamide and 7±1.4 kPa for κ-carrageenan. Next, hollow-lattice geometry with a strut width of 900 μm was printed at 2.4 mW/cm² with an exposure time of 15 seconds per layer (FIG. 3B). This structure can withstand a load of 75g m for 20 seconds by stretching 8 times its original length (FIG. 3B). Overall, these results indicate that the hybrid gel structure obtains its elongation properties from the acrylamide gel, and the addition of κ-carrageenan increases the stiffness properties. It is suggested that a double helical structure in the κ-carrageenan starts to break at a small strain that unzipped progressively as the strain increases and leads to permanent deformation. The breaking of cross-linked double helices of κ-carrageenan serves as a sacrificial bond, which greatly helps to improve the stiffness of DN hydrogel through energy dissipation. Throughout the process, the acrylamide network remains intact and maintains the geometry of the printed structure. Standard dog-bone geometry was used to characterize the influence of many processing variables on tensile regimes.

Influence of DN Formulations on Tensile Properties

Figure 4:
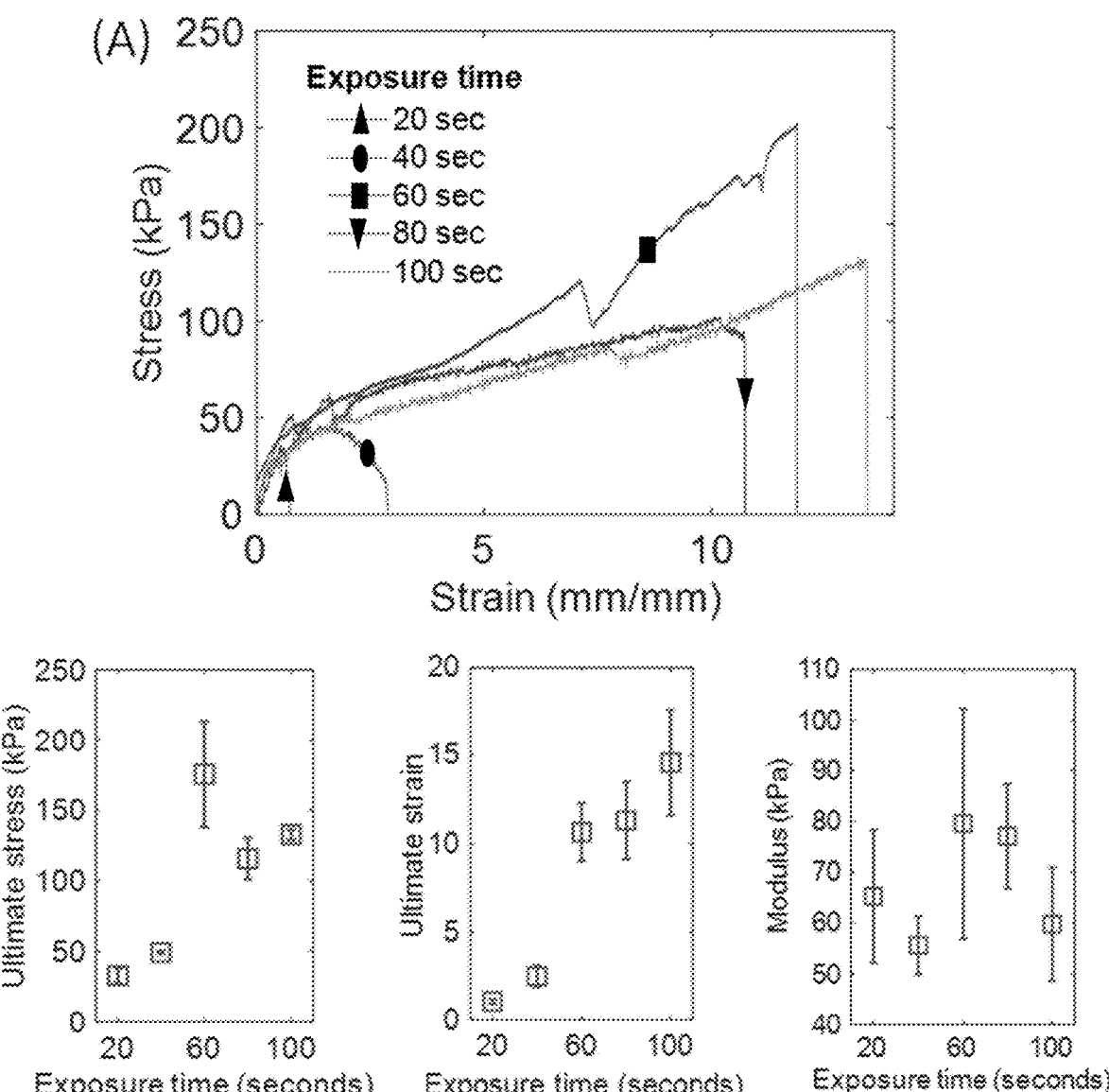
FIG. 4 is a series of plots showing the stress-strain curve obtained from the DN gel structures exposed to different exposure times. Ultimate stress, ultimate strain, and tensile modulus were recorded for the fabricated structures with varying exposure times. (Error bars: Mean±SD).

Role of light dosage. Dogbone DN gels structures were printed using TOPS using single exposure by varying the exposure time from 20 to 100 seconds while maintaining constant laser intensity of 2.17 mW/cm². Structures printed using the exposure time of 40 seconds and below break down with very small stress of 50 kPa and exhibit strain of less than 3 (FIG. 3C). The structures fabricated with exposure times of the 20 seconds and 40 s were underexposed and the associated covalent network of acrylamide is partially formed so that they exhibit less stretchability and accompanying ultimate stress. The highest ultimate stress of 175±37 kPa was found for the exposure time of 60 seconds. Above this exposure time of 60 seconds, there is a slight decrease in ultimate stress, but the difference is not significant (FIG. 3C). Similarly, the difference in strain is also minimum among the structures printed above 60 seconds although the highest ultimate strain of 14.59±3 is observed for the structures printed with the longest exposure time of 100 seconds (FIG. 3C). Further, the elastic modulus does not significantly vary for the structures printed with different exposure times (FIG. 4). Plots showing the representative stress-strain curve obtained from the DN gel structures irradiated to different exposure times and the corresponding elastic modulus obtained from the structures are depicted (FIG. 4).

Figure 5:
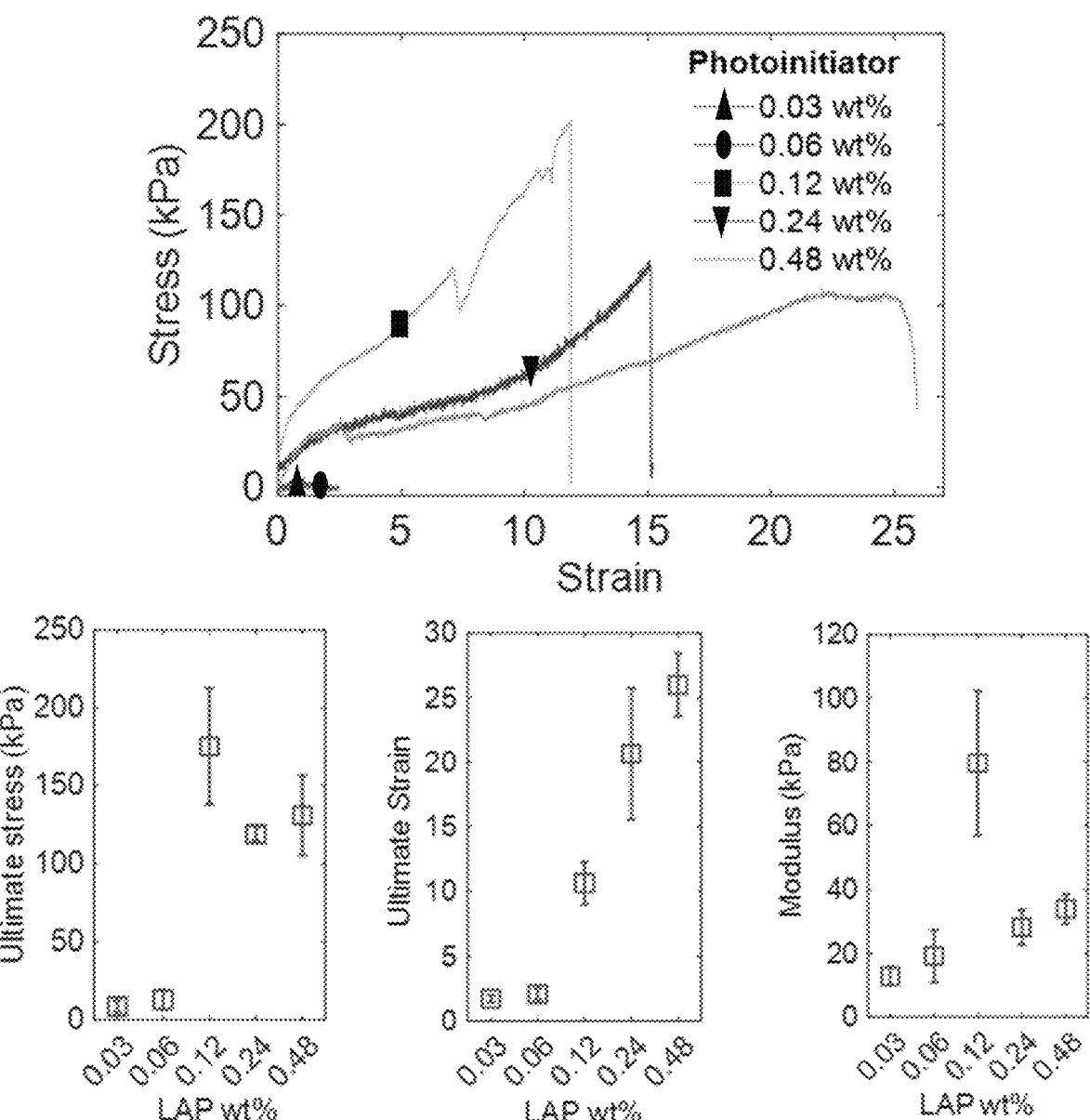
FIG. 5 is a series of stress-strain curves measured from the hybrid gel structure with varying proportions of photoinitiator. Ultimate stress, ultimate strain, and elastic moduli were recorded for the DN gel structures with varying concentrations of photoinitiator. (Error bars: Mean±SD).

Role of photoinitiator concentration. Dogbone DN samples were printed at a laser intensity of 2.17 mW/cm² and an exposure time of 60 seconds using varying concentrations of LAP (0.03 wt % to 0.48 wt %). Structures with 0.03 wt % and 0.06 wt % LAP did not perform well while stretching and exhibited ultimate stress of less than 13 kPa (FIG. 3D). The stress increased to 175.3±37 kPa for the structure printed with 0.12 wt % LAP. Further, an increase in the concentration of the photoinitiator to 0.24 wt % and 0.48 wt % decreased the ultimate stress to 119±4 kPa and 131±25 kPa (FIG. 5). There was an increasing trend in terms of ultimate strain and the maximum strain of 25.99±2 kPa is found for the structure printed using the DN gel with the highest LAP concentration (FIG. 3D). Plots showing the representative stress-strain curve obtained from structure printed by varying photoinitiator concentration and corresponding variation in the modulus of the structure are mentioned (FIG. 5). The change in modulus trend is similar to ultimate stress, where the modulus remained almost negligible for two small concentrations of LAP and reaches a maximum of 79±22 kPa for 0.12 wt % and dropped to 28±5.4 kPa and 33.8±4.6 kPa for 0.24 wt % and 0.48 wt % (FIG. 5).

Figure 6:
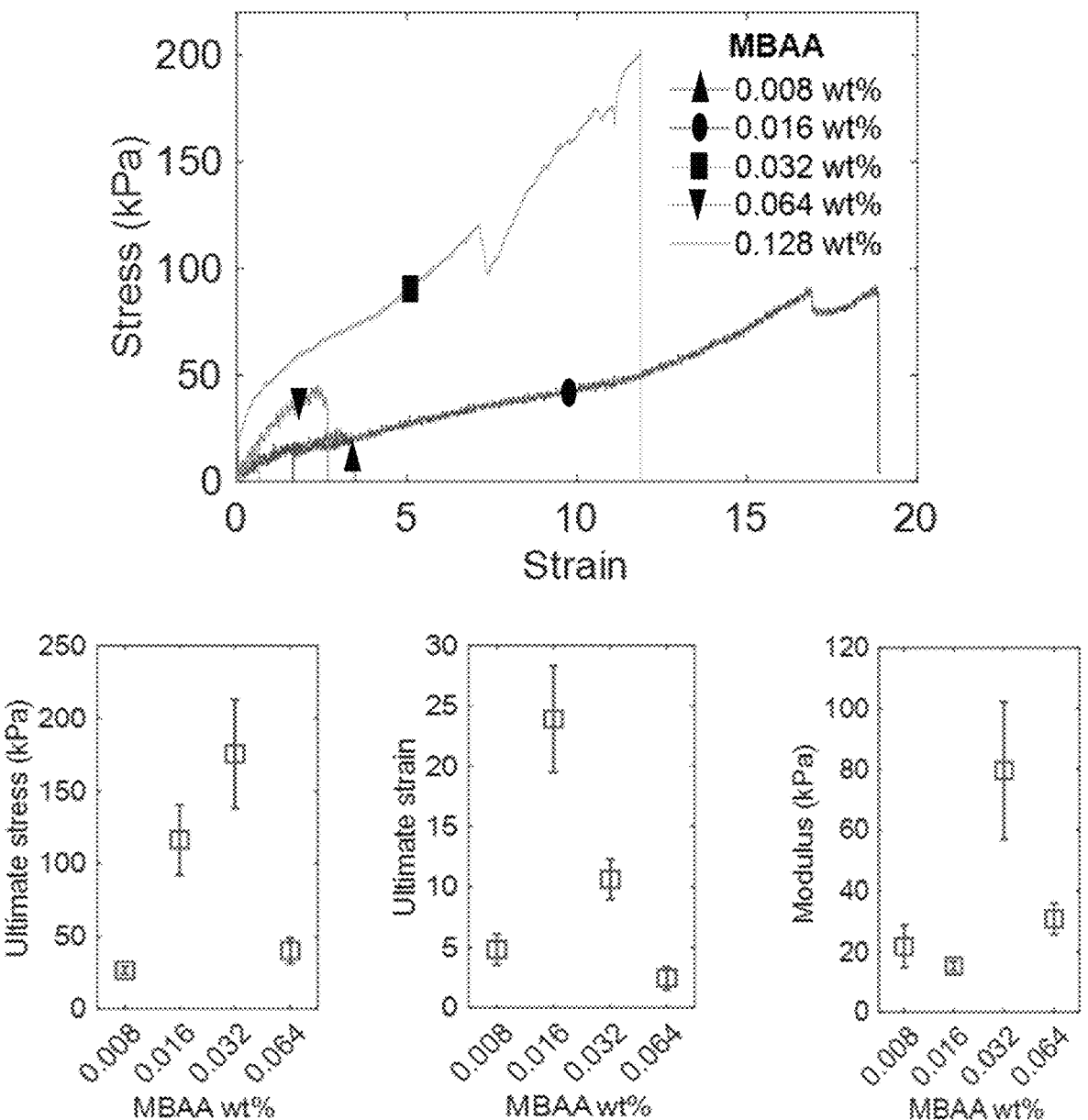
FIG. 6 is a series of graphs of the stress-strain curve recorded from the hybrid gel structures printed with varying proportions of MBAA crosslinker (0.008 wt %, 0.016 wt %, 0.032 wt %, 0.064 wt %, and 0.128 wt %,). Ultimate stress, ultimate strain, and elastic moduli for the structures printed with varying amounts of MBAA crosslinker (Error bars: Mean±SD).

Role of crosslinker concentration. Dogbone DN samples were printed using TOPS with varying concentrations of MBAA (0.008 wt % to 0.128 wt %). Results showed that the highest ultimate stress of 175±37 kPa and the ultimate strain of 10±1.64 kPa was observed for the 0.032 wt % MBAA. The ultimate stress decreased to 116±24 kPa while the ultimate strain increased to 23.8±4.4 for the MBAA concentration of 0.016 wt % (FIG. 3E). These parameters decreased significantly when the MBAA concentration decreased to 0.008 wt %. Further, an increase in the concentration of MBAA crosslinker to 0.064 wt % and 0.128 wt % also decreased both the stretchability and force required to break the dog-bone structure. The structure printed with an MBAA concentration of 0.128 wt % readily broke, and hence was omitted for further studies (FIG. 3E). The elastic modulus of 79.5±22 kPa was highest for an MBAA concentration of 0.032 wt % and the moduli were less than 30 kPa for structures printed with the other MBAA concentrations (FIG. 6). Essentially, an increase in the concentration of crosslinker increases the crosslinking density, which leads to a short chain of the polyacrylamide, and a shorter chain results in low fracture energy. In both extreme cases when the crosslinker concentrator is high or low, the covalent network becomes too complaint, leading to deformation of the network with small stress.

Figure 7:
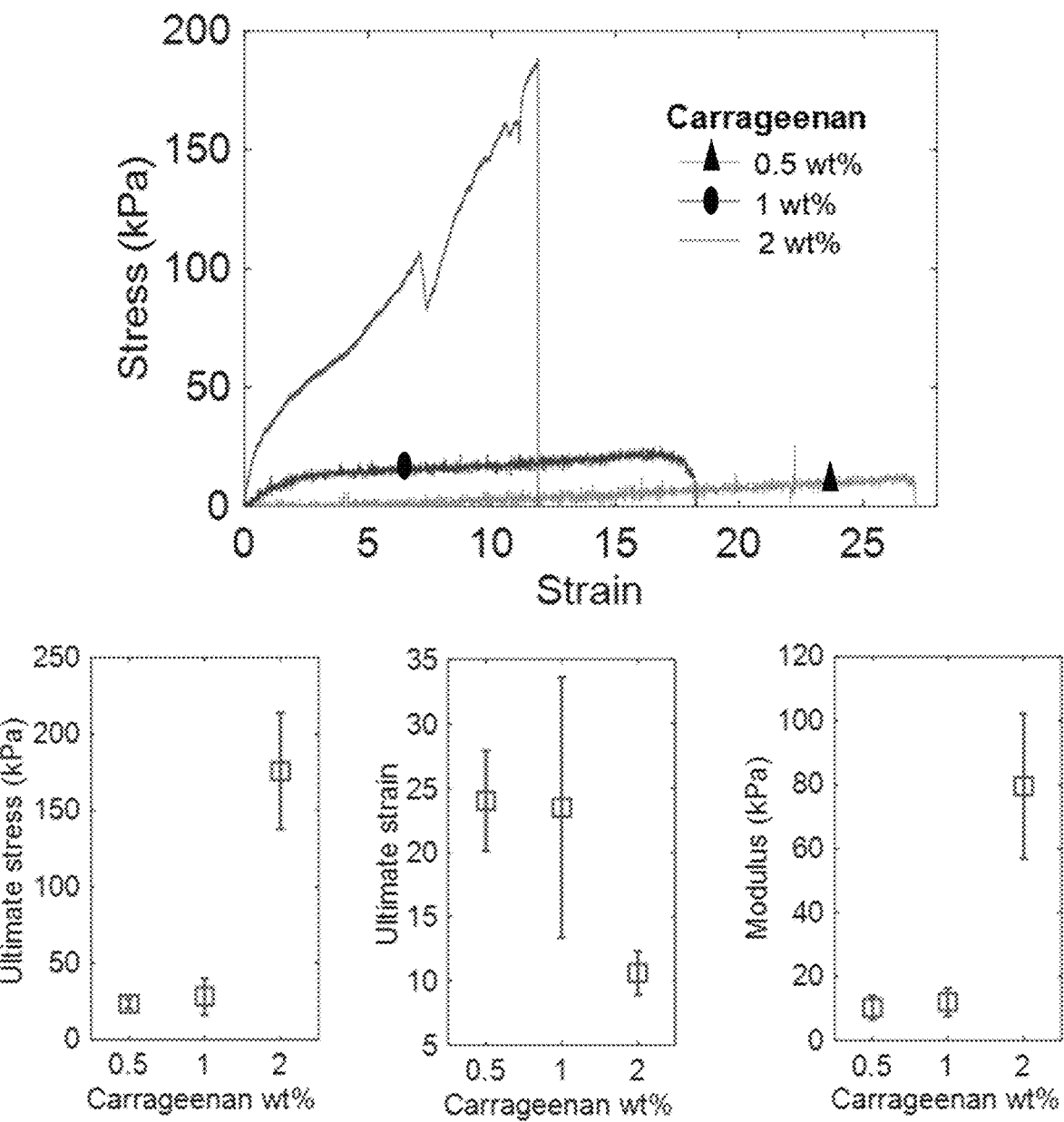
FIG. 7 is a series of graphs of the stress-strain curve recorded from the hybrid structures printed with varying proportions of κ-carrageenan (0.5 wt %, 1 wt %, and 2 wt %). (Error bars: Mean±SD).

Role of κ-carrageenan concentration, Dogbone DN samples were printed with three concentrations of κ-carrageenan: 0.5 wt %, 1 wt %, and 2 wt %, and above this concentration, κ-carrageenan did not dissolve in the water. As expected, the lower concentration κ-carrageenan structures were soft and highly stretchable. The strain decreased from 24±3.9 to 10.6±1.69, when the concentration of κ-carrageenan increased from 0.5 wt % to 2 wt %, whereas the ultimate stress increased from 23.5±3 kPa to 175±3 kPa (FIG. 3F). The elastic modulus of 79.5±22 kPa was highest for the structure printed with 2 wt % κ-carrageenan and decreased with decreasing κ-carrageenan concentration (FIG. 7). This result suggests that the κ-carrageenan increases the stiffness properties whereas the acrylamide contributes to the stretching properties of the structure printed with hybrid gels.

Necking and Remedy of Necking Phenomena

Figure 8:
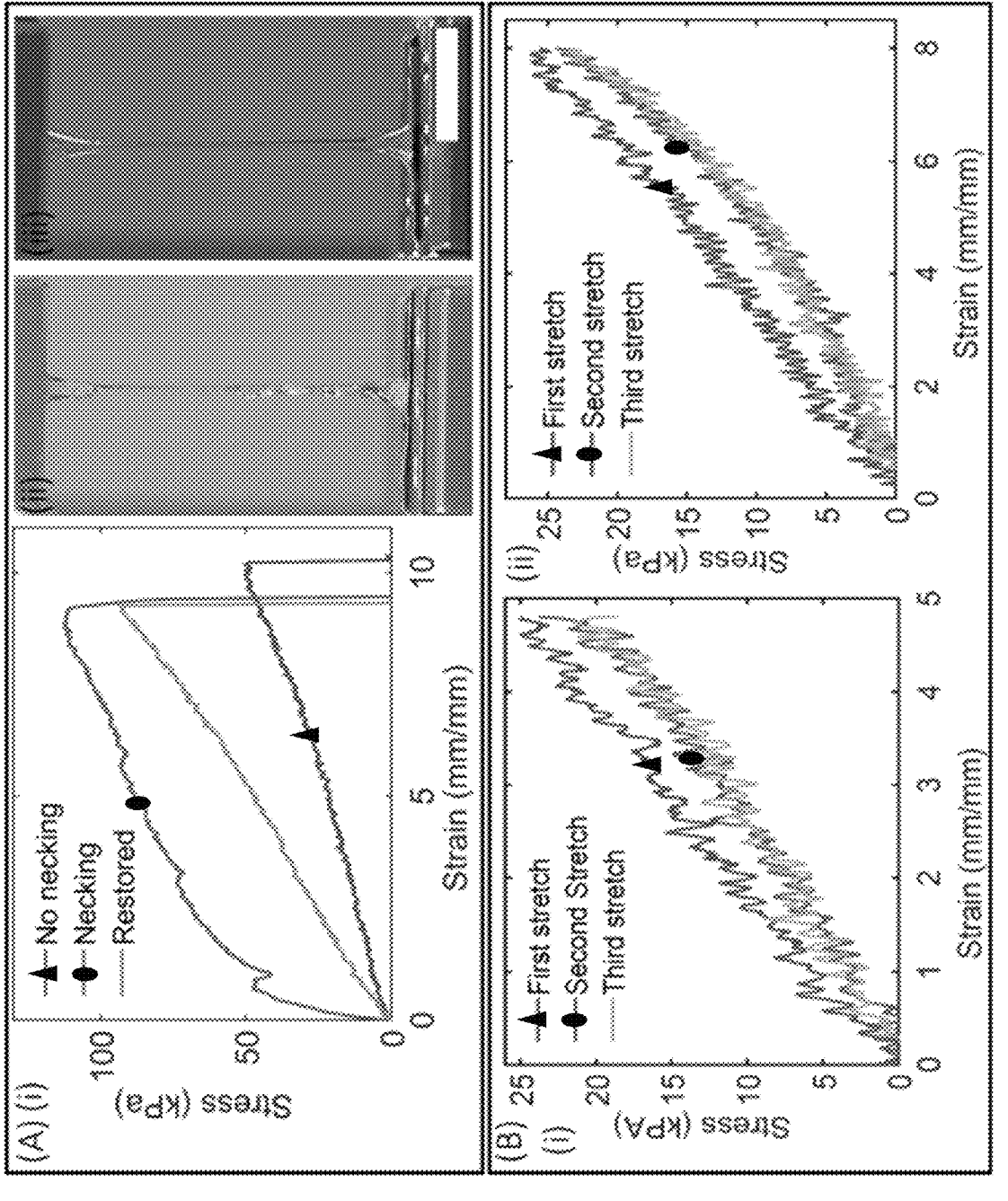
Figure 8:
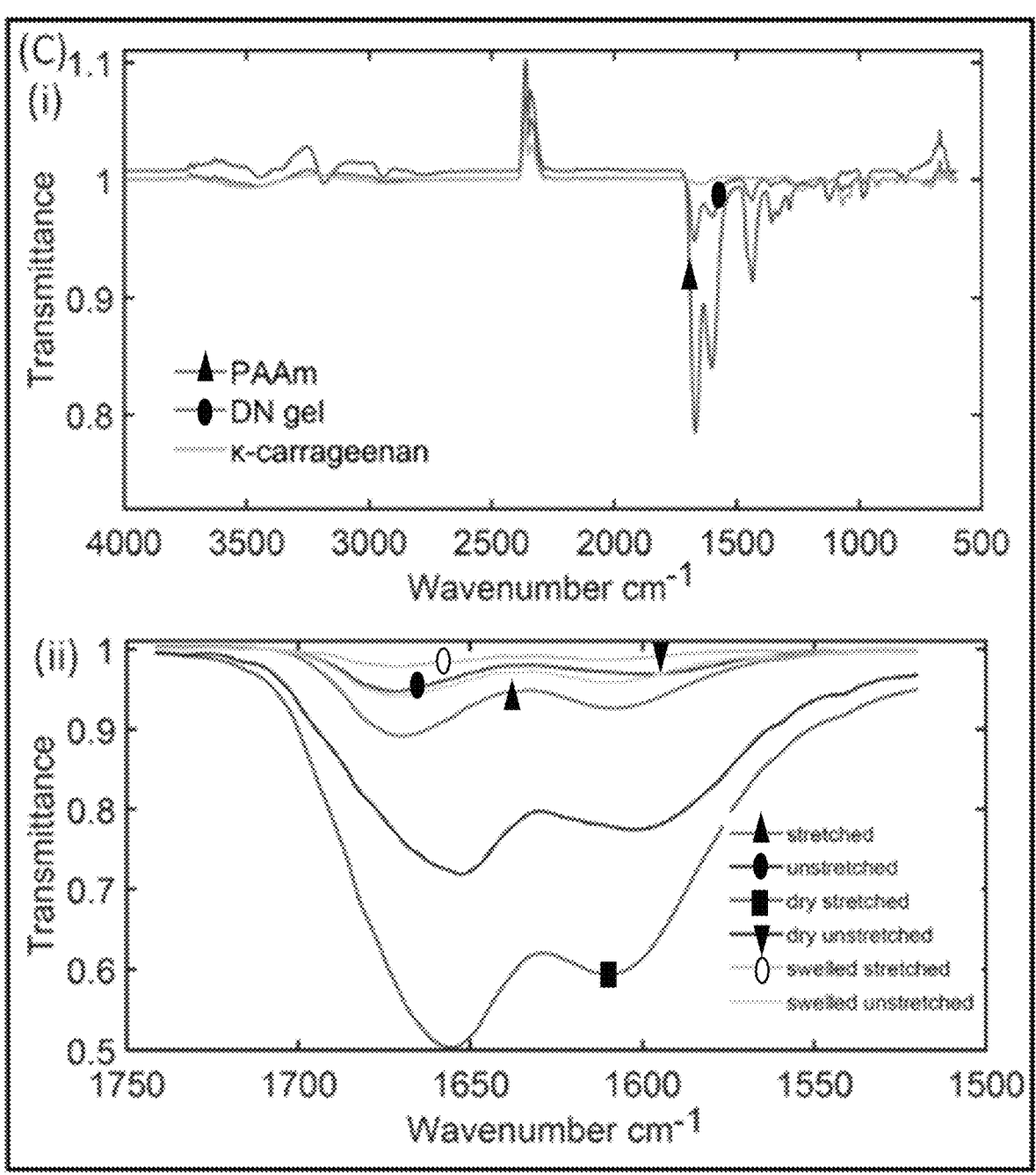

Many studies on DN hydrogels mentioned and provided several insights and theories into the necking phenomena. However, they failed to provide a solution to this behavior. The necking behavior was also observed in the printed hybrid DN gel structure (FIG. 8). The applied stress first monotonically stretched the structure uniformly to the approximate strain of ~1.5. Further increase in stress, led to the appearance of the necked region. There were instances of samples where multiple necked regions were observed. Apparently, the weakenedsection of the sample, which happened to be in the necked region, resulted in its failure. Stretched necked samples were unable to recover.

The phenomenon of necking occurs when there is spatial variability within the material structure, which causes the material to experience disproportionate stress during deformation, leading to instability and resulting in localized strain in a specific area. It is anticipated that necking in the printed DN gel structures occurred due to the inhomogeneous spatial distribution of water within the structure. The heterogeneity occurs as the surface of the printed structure loses water faster than the center of the structure during the printing and/or handling of the structures. Upon being subjected to the tensile stress, the center of the structure, which contains more amounts of water experiences greater strain compared to the surface. The printed structure under stress compensates for this by necking. The superficial loss of water was compensated for by immersing the printed structure in water for 5 minutes prior to recording stress-strain plots. Plots show that the structures did not show the necking phenomenon (FIG. 8A (i-ii)), but exhibited lower stress compared to that of the structure exhibiting necking. The stress associated to stretch the swelled structure decreases with the increase in the total water content (FIG. 8A(i)). Following immersion in water for 5 minutes, the structure swelled to 170% in volume resulting in 87% total water content. This decreased the associated stress required to stretch the structure by almost half (FIG. 8A (i), blue curve). The stress can be compensated by decreasing the water content of the prepolymer solution. Herein, a prepoly- FTIR studies of DN gel structure. FTIR spectra of molded and casted κ-carrageenan, TOPS-printed PAAm, and DN gels (dried, and swollen) are shown and the FTIR fingerprints associated with functional groups are assigned (FIG. 8C(i)). FTIR spectra were acquired from as-printed, dry, and swollen dog-bone DN gel structures before and after tensile loading. The dry samples were obtained by drying them overnight at room temperature and the swollen samples were obtained by immersing them in water for 4 hours. Of particular interest in this study are bands corresponding to moieties that participate in hydrogen bonds, such as the amide I (C=O stretching) band and amide II (N—H bending) band (FIG. 8C(ii)). The observed FTIR bands and their assignments are summarized in Table 1. The amide I stretching band responds to the extent of hydration of the DN gel sample due to changes in the degree of hydrogen bonding. This band is shifted to a lower wavenumber in dried samples compared to hydrated as-printed and swollen samples due to an increase in intermolecular polymer-polymer hydrogen bonding. As evidenced by the absence of band shifting after tensile loading, the amide I band is relatively insensitive to changes in inter-and intra-molecular forces induced by mechanical loading.

TABLE 1

FTIR fingerprints associated with functional groups amide I (C=O stretching) band and amide II (N—H bending) band obtained from polyacrylamide, as-printed, dry, and swollen DN gels dog-bone structures.

| PAAm Reported | PAAm | DN gel structure | DN gel structure (Stretched) | Dried DN gel structure | Dried DN gel structure (Stretched) | Swollen DN gel structure | Swollen DN gel structure (Stretched) | Assignment |
|---|---|---|---|---|---|---|---|---|
| 1618 | 1600 | 1598 | 1608 | 1602 | 1610 | 1609 | 1609 | δ, NH$_2$ amide II |
| 1660 | 1668 | 1672 | 1670 | 1653 | 1655 | 1671 | 1671 | ν, C=O amide I |

νstretching; δ, bending.

mer solution was prepared by decreasing the water content of the prepolymer solution to 60%. Dog-bone structures were printed using the TOPS lithography and immersed in water for 15 minutes swelled to 222% in volume, which resulted in total water content of 82%. The stress-strain test showed an improvement in stiffness and associated stress (FIG. 8A(i)). We suggest structures dipped in water for less than 15 minutes did not acquire the homogeneous spatial distribution of water and displayed necking phenomena. Swelling of the structure and the influence of swelling on the tensile properties are shown (FIGS. 9-12). Response to cyclic loading-unloading and FTIR studies of DN gels Cyclic loading-unloading. DN dog-bones, hydrated for 10 minutes, were stretched to the strain of 480% for three repetitions, and fracture energy was calculated for all the repetitions. Results showed that the fracture energy for the first cycle was 61.059 J/m$^2$, which decreased to 44.92 J/m$^2$ for the second cycle, however, the loss was only 0.94 J/m$^2$ from the second to the third cycle (FIG. 8B(i)). Next, the experiment was repeated by stretching the structures to the strain of 800% for the three-repetition cycle. There is a decrease in fracture energy from 98.67 J/m$^2$ to 69.41 J/m$^2$ during the first and the second cycles. The energy loss is 1.93 J/m$^2$ from the second to the third cycle (FIG. 8B(ii)). The cyclic uniaxial tension showed a significant loss of energy during the first cycle of loading and unloading, and the loss was negligible during the second cycle. Energy loss increased with increasing the stretch. There is a gradual internal fracture as we increase the strain.

The amide II bending band is affected by tensile loading in as-printed and dried samples. Wavenumbers increase by 8-10 cm$^{-1}$ to approximately 1609 cm$^{-1}$ following tensile loading as compared to the equivalent unloaded control observed at ~1598 cm$^{-1}$. This is indicative of a reduction in inter-and intra-molecular interactions between polymer chains due to mechanically induced physical separation of the polymer chains. This can be attributed to the fracture energy loss during the structure's cyclic loading (FIG. 8B). Notably, no such mechanically-induced band shift was observed for swollen samples, where the amide II band appears at 1609 cm$^{-1}$ both before and after loading. The main reason for this phenomenon is the complete solvation of the polymer matrix with hydration shells forming around the polymer chains. The net result is a marked reduction in polymer-polymer interaction in the fully swollen state.

Self-Healing Behavior

The thermoreversible sol-gel transition of the κ-carrageenan network exhibits healing behavior at 80° C. A rectangular slab geometry, printed using TOPS, was cut in half using a sharp razor blade. To visualize the self-healing interface, one of the halves was stained with faint blue dye. Then, the two-piece was placed in close contact and heated to 80° C. for 20 minutes and followed by cold conditions to initiate physical crosslinking of the κ-carrageenan network. The self-healed monolithic structure was able to withstand a weight of 70 gm and the self-healed interface starts to rupture when the load is increased to 200 gm. Similar experiments with self-healed DN dogbone samples resulted in an ultimate stress of 24±3 kPa and breaks at a strain of 2.5±0.6, much lower than as-printed samples. This is because self-healing takes place only in the physical network of the κ-carrageenan network and the fractured part of the first photo crosslinked network is unable to remake.

Compressive Performance of DN Hydrogel Structure

Mechanical properties of DN cylindrical stub structure under compression were compared with identical structures made from single-network structures (acrylamide-only, κ-carrageenan only). Cylindrical stubs, printed using 2.17 mW/cm$^2$ and an exposure time of 70 seconds, were subjected to uniaxial compression and associated stress and strains were plotted (FIG. 14). Results show that the ultimate compressive stress in the case of the DN structure was 15 MPa at a strain of 95%; 10× and 150×the stress possible by acrylamide and κ-carrageenan structures respectively. κ-carrageenan-only fractures at 0.032 MPa and a strain of 50% while polyacrylamide-only structure fractures at 1.45 MPa and a strain of 89% (FIG. 14A). The result suggests both the κ-carrageenan network and acrylamide network increase the toughness of the hybrid structure not just by simple interpenetration but also through a possible synergistic interaction of two networks. Next, TOPS was used to print a 3D Mayan pyramid and tested under compression (FIG. 14B). Even after 95% strain for 3 cycles, the structure recovers back to its original shape with little deformation upon unloading. A small difference is observed in the force-strain plots between cycle 1 and 2, while little-to-no differences are observed between cycles 2 and 3, demonstrating superior shape recoverability of printed structures (FIG. 14C). Compression tests were performed on the swelled structures, which were immersed in water for 4 days. The original structure swelled almost 5 times its volume and the compression result showed that these highly flaccid structures can stand the ultimate compression strain of 84% and the associated stress was 0.1 MPa, which is 150 times smaller than the ultimate stress associated with the original structure (FIG. 14D).

Specific roles of κ-carrageenan concentration and exposure times on the compressive properties of printed DN structures were also studied. Decreasing the concentration of κ-carrageenan decreases the ability of the structure to withstand loads, as κ-carrageenan increases the stiffness of the hybrid structures when added to acrylamide (FIG. 15). This implies that the κ-carrageenan interacts with acrylamide to increase the stiffness of the structure. These results are consistent with the tensile results. The light dose also affected the compression properties of the 3D-printed hybrid structure (FIG. 14E). Structures printed with lower exposure times were softer compared to the structure printed using a longer exposure time (FIG. 14E, inset). Longer exposure time strengthens the covalent bond of the acrylamide network thereby increasing the stiffness of the material.

Shaping DN Hydrogels Into a Dynamically Tunable Soft Photonic Device Using TOPS Here, an axicon lens (a conical prism) capable of generating a dynamically reconfigurable quasi-Bessel beam and its characteristic annual ring was printed. First, the transparency of the DN hydrogels was characterized. The transmission spectra of printed DN geometry showed a transmissivity of more than 90% over the wavelength of 400-800 nm (FIG. 16A). A printed slab of DN gels structures clearly showed the logo of Bioinspired Institute, depicting the high transparency of the structure (FIG. 16A, inset). Next, TOPS was used to print an axicon lens with a laser intensity of 2.17 mW/cm$^2$ and exposure time per layer of 15 seconds, and a layer thickness of 50 μm (FIG. 16B). The diameter and thickness of the as-printed lens are 8 mm and 3.65 mm respectively and the base angle (β) is measured to be 24.5 degrees. In as-printed static conditions, Gaussian beam passed through the axicon lens and generated an annular ring (FIG. 16C). Then, biaxial tensile stress was applied to the DN axicon lens using a custom-built stretching device (FIG. 16D). Dynamic stretching of the DN lens results in a corresponding increase in the cone apex angle and a decrease in the diameter of the annular ring as visualized using a digital SLR camera (FIG. 16D). Mechanically reconfigurable DN axicon lenses represent a new class of soft multifunctional photonic devices.

Comparison of Resolution and Mechanical Properties: State-of-Art Vs TOPS-Enabled DN Gels Structures Among various fabrication methods at disposal, extrusion-based direct ink writing (DIW) is the most widely used, however, achieving a resolution of 200 μm or less remains challenging. Localized multiphoton polymerization-based 3d printing techniques can solidify the liquid resin into a geometrically complex high-resolution structure at a micrometer scale. The resolution of the TOPS lithography system is comparable to different kinds of optical projection lithography such as DLP, or CLIP, which support the fast fabrication of 3D hydrogel structures with a resolution of approximately 10 μm. Strain associated with TOPS-printed DN gels surpass other 3D-printed single network hydrogels (FIG. 17A).

TOPS-printed high-resolution 3D DN structures simultaneously exhibit superior mechanical properties in both tensile regimes (strain of 2400%, stress of 130 kPa) and compression regimes (strain of 95%, and stress of 15 MPa) with a high degree of recoverability. Also, the elastic modulus and the fracture energy of our structures are 98 kPa and 1238.1 J/m$^2$ respectively. A comparison of this work with DN hydrogels in terms of fracture energy and young's modulus is provided in FIG. 17B. These values were better than the single network hydrogels and comparable to most tough hydrogels, double network hydrogels, and tough soft bio tissues. As far as we know, this unique combination of high-resolution, 3D design flexibility, stretchability, compressibility, and recoverability is better than current state-of-art, which includes DN structures printed using light and extrusion-based printing methods as well as conventional casting/molding strategies.

Since the literature does not report all aspects, efforts were made to compare the results of the present invention with existing literature using a chart showing ultimate stress and strain in both tensile (upper part) and compression (lower part) regimes. Minimal feature resolution (smaller the better) is also included in the legend (FIG. 17C). The best resolution was obtained for the optics-based printing of PAAm/PEGDA which showed a resolution of ~7 μm. The smallest feature size obtained for our work after the development stage was 37 μm. Structure as small as 12 μm was printed, however, they did not survive the development stage. The ultimate tensile stress of TOPS DN structures is comparable with other 3D printed DN structures, whereas the ultimate strain of our samples is better than most other DN gel structures. Closest to our strain response in tension (2400%), extrusion-printed PAAM/κ-carrageenan showed a strain of ~20, whereas the optics-based dual photocrosslinking of AAm/PEGDA showed the ultimate strain of ~12. Our compression strain (95%) is similar to the reported work, for instance, extrusion-based printing of PEG/Alginate/nano clay, molding/casting using Agar/PAAm. The ultimate compression stress was highest for the PAMP/AAMS, which is 93.5 MPa, however, it is not clear if the structure can recover after the compressive stress is removed In our case, printed structure with ultimate stress of 15 MPa can recover. The only study with comparable mechanical properties was Aam/AMPS, however, the resolution of printing of this material system is limited to 600 µm, while the resolution of this work is 37 µm. Based on this, TOPS-based DN structures exhibit better mechanical properties as compared to other DN structures.

In the present invention, the prepolymer formulation was optimized to obtain superior mechanical properties in both tensile and compression regime; formulation is composed of acrylamide (16 wt %), κ-carrageenan (2 wt %), MBAA (0.03 wt %), and photoinitiator LAP (0.12 wt %). Photocrosslinking of the primary acrylamide network ensures the structural integrity during printing while cooling below the sol-gel transitions temperature of 80° C. results in physical crosslinking of the secondary κ-carrageenan network. Since fracture energy of the DN structures is greater than the sum of fracture energies of individual network structures, it points to synergistic effect of crosslinking and chain entanglements between the two networks. Tensile tests show that acrylamide and κ-carrageenan networks contribute to stretchability and stiffness respectively. Results show that many processing variables modulate the mechanical properties of printed structures. For instance, development of printed structure above 80° C. and duration of more than 3 minutes can lead to heat-induced distortions of the DN structures. An increase in crosslinker (MBAA) concentration shows low fracture energy, while an increase in exposure times strengthens the covalent bond of the acrylamide network thereby increasing the stiffness of the material. Necking behavior was seen in as-printed samples. By simply immersing the samples in DI water for a few mins solves the issue of necking; this implies that non-uniform hydration of samples (drying) likely generates stress defects which lead to localized strain or necking during tensile loading. Results also indicate lower mechanical performance with increased swelling duration, especially in the tensile regime.

Although possible, self-healed DN structures exhibit inferior ultimate stress and strain as compared to the as-printed structures, as only the κ-carrageenan network participates with the limited interpenetration of the network at the defect site. The compression properties of these structures are comparable to the mechanical properties of bovine cartilage and surpass previously reported 3D-printed DN hydrogel structures.

The present invention and the use of TOPS allowed the printing of 3D structures while maintaining the desired temperature of the prepolymer solution. This optical technique of fabrication was demonstrated to print DN hydrogel of acrylamide and κ-carrageenan at the resolution of 37 µm. The as printed 2D/3D structures were complex, mechanically strong, highly stretchable, and transparent and exhibited tunable mechanical properties by varying the light exposure and material composition. The printed structures performed equally well under compression and tensile force, unlike most other 3D printed DN gels structures, which only performed well under either tensile or compression force. The method was shown to print an elastomeric axicon lens that can create a tunable Bessel beam. This provides an extra degree of freedom for photonic components and system design. It is envisioned that the unique capability of TOPS to print on-demand 3D elastomeric transparent structures can be utilized in a range of applications such as soft robotics, soft wearable electronics, adaptive optics, augmented reality, tissue engineering, and regenerative medicine.

Methods

Chemicals. All chemicals were used as received and were of analytical grade. Acrylamide (AAm), κ-carrageenan, N,N'-methylenebisacrylamide (MBAA), and tartrazine were purchased from Sigma-Aldrich. LAP was synthesized in our laboratory. Lithium phenyl-2,4,6-trimethyl-benzoyl phosphinate (LAP) was synthesized in a two-stage process based on a recognized method. First, 2,4,6-trimethylbenzoyl chloride (4.5 g, 25 mmol) was added dropwise to continuously stirred dimethyl phenyl phosphonate (4.2 g, 25 mmol). This was performed at room temperature under argon. This solution was stirred for 24 hours before adding an excess of lithium bromide (2.4 g, 28 mmol) in 50 mL of 2-butanone to the reaction mixture at 50° C., to obtain a solid precipitate after 10 min. The mixture was then cooled to room temperature, allowed to rest overnight, and then filtered. The filtrate was washed with 2-butanone (3×25 mL) to remove unreacted lithium bromide and dried under vacuum to give LAP (6.2 g, 22 mmol, 88% yield) as a white solid.

TOPS-based 3D printing of DN hydrogels. TOPS-lithography optical setup used to fabricate the acrylamide/κ-carrageenan structures is shown (FIG. 1B). This setup consisted of a 405 nm CW laser (Toptica) and the laser beam was expanded and spatially cleaned using a lens telescope and pinhole. The beam was directed toward the rotating diffuser, which changed the Gaussian intensity profile of the laser beam to uniform intensity distribution. Further, the rotation of the diffuser averages out the laser speckle. The diffuser diverged the laser beam which was collimated using a lens and the beam was projected into the digital micro-mirror (DMD) device. DMD is an array of micro minors that spatially pattern the laser beam, which was directed towards the projection optics by a dichroic minor. The projection lens assembly consisted of two lenses (f=200 mm), which projected the beam with unity magnification into the prepolymer solution. An imaging arm was incorporated into the setup that was used to view the fabrication process.

The sample holder was fabricated with copper plate and PDMS a. A circular disk-shaped PDMS thin film was molded and a copper plate with a circular hole (diameter 16 mm) was thermally crosslinked on top of the PDMS disk. The rim of the sample holder was prepared by molding and casting and was thermally crosslinked on the top of the copper plate. The sample holder was heated using two heating rods. An L-shaped z-stage was controlled by a linear actuator (PI) and a controller (G910, PI). A custom-written LabVIEW program was used to coordinate various processes, such as switching the DMD masks, turning the laser ON and OFF, and the z-direction movement of the stage.

It was important to maintain a critical temperature of the solution throughout the fabrication process, hence a CAD model of the sample holder was designed so that the temperature distribution could be studied using simulations. The design of the sample holder consisted of a copper plate with a center hole embedded inside the PDMS bath (FIG. 1C)). Two heated rods on either side of the dish were designed to heat the copper plate and the 16 mm diameter hole in the Cu plate acted as the fabrication window. To gain a better insight into the temperature distribution over the PDMS layer of the sample holder design, computational fluid dynamics (CFD) simulation with conjugate heat transfer was performed. The computational domain consisted of the designed PDMS dish and a copper plate extended on either side of the dish (FIG. 3C). At the top and bottom surface of the copper plate, a constant temperature boundary condition with T=416 K (142.85° C.) was applied to mimic the heater (used in an experimental study). All other surfaces of the geometry were provided with convection heat transfer to ambient temperature ($T_{amb}$=300 K (26.85° C.).

The simulation was performed by discretizing the computational domain into a finite number of control volumes (or grid points) and by simultaneously solving the physical equations of continuity, momentum, and energy, in each point to obtain the spatial and temporal distribution of temperature. For the computational domain, a mesh with 160,000 grid points was utilized to obtain the temperature distribution (FIG. 18). The distribution was obtained for various time points until the steady state is attained. After the simulation study, the mesh was refined, and the simulation was repeated for meshes with 200,000, 240,000, and 280,000 grid points to investigate the grid sensitivity of the result. By comparing temperature distribution over the PDMS layer for different meshes, one with 240,000 grid points was found to be an optimum mesh which is utilized for further study here.

Finite volume methods-based commercial solver ANSYS Fluent was utilized to solve the equations. In the simulation, the entire domain was first initialized with $T_{init}$=353 K (79.85° C.), and the ambient was set at 300 K (26.85° C.). The operating pressure was 1 atm. FIG. 18 shows the temperature distribution over the PDMS layer at different time instants obtained using the optimum mesh. At approximately t=90 s, the spatial distribution of temperature attains a steady state and further continuing the simulation shows no changes in the state.

Fabrication and characterization of DN gel structure. Fabrication was performed at an elevated temperature of 80° C. First, a custom-written MATLAB code was used to slice a 3D model of interest and was used to create a stack of the digital masks, which are binary portable network graphics (png) image files. The digital masks were uploaded to DMD, which selectively turn on/off the minor to pattern the laser beam. This crosslinked a single layer inside the prepolymer solution. The change of the mask in the DMD was coordinated with the upward movement of the stage using a LabVIEW program. The laser beam photopolymerized the acrylamide to fabricate three-dimension, transparent structures. Next, the structure was placed into an ice bath to complete physical cross-linking Digital optical microscope imaging. A Digital optical microscope (HIROX, KH-8700) was used to image and characterize the fabricated structure with a resolution of 1.16 μm using an MX(G)-2016(z) objective lens.

Mechanical Characterization.

Tensile testing. The tensile testing was performed using a tensile tester (250 lbs Actuator, Test Resources) at room temperature. Samples were printed into dog-bone shapes with a length of 6.25 mm and a gauge width of 1.50 mm. These structures were pulled at a rate of 150% strain (9.375 mm/min using a load cell of 25 N. Modulus of the elasticity was calculated as maximum slope at the elastic region of the stress-strain plot. The fracture energy was estimated as the area under the stress-strain curve.

Compression testing. The compression testing was performed using a Universal testing System (Model-5966, Instron) at room temperature. Cylindrical stud structures were printed and compressed at a rate of 0.5 mm/min.

FTIR studies. Infrared analyses were performed in attenuated total reflection mode (ATR) using a Bruker Tensor 27 FTIR spectrometer equipped with a MIRacle ZnSe single reflection ATR block and KBr beam splitter. Spectra of the printed dual network (DN) gel samples were recorded in the range 600-4000 cm$^{-1}$ with a resolution of 4 cm$^{-1}$ and a sampling frequency of 32 scans. Samples were analyzed at three levels of hydration, both before and after tensile loading. Interfering peaks from water were removed from hydrated DN gel samples via subtraction of a spectrum averaged from replicate samples (n=9) of Nanopure deionized water (18 MΩ-cm).

Lens stretcher. A custom 'lens stretcher' was designed to stretch the printed optical constructs by desired increments. The stretcher was designed in Autodesk Inventor and assembled thereafter. The base plate was 3D printed and designed to affix to a Thorlabs optical fixture. This allowed the entire stretcher to be mounted in line with the light path. The construct is placed on the raised center platform and the central hole in the base plate allows light to pass through both the plate and the construct. Four servo motors with linear actuation gearing were used to achieve uniform stretching of the constructs from all four sides. The servo motors were programmed via Arduino to move uniformly to any desired position in their range of motion. Small binder clips were fastened to the linear slides so the constructs could be attached firmly without slipping or tearing.

What is claimed is:

1. A method of forming a three-dimensional structure, comprising the steps of:
   providing a sample holder including a metal plate having a fabrication window formed therethrough and a transparent dish positioned on top of the metal plate, a source of heat coupled to the metal plate, and a source of modulated irradiation positioned below said metal plate and configured to deliver a spatially modulated pattern of light through said fabrication window;
   supplying a formulation including a set of components onto the sample holder to form a first layer of a double network hydrogel, wherein the first component of said set of components is a photo-crosslinked prepolymer and a second component of said set of components is a physical crosslinked prepolymer having a transition temperature;
   maintaining a temperature of the formulation in said sample holder above the transition temperature of the seconds component with the source of heat while simultaneously polymerizing the first component of said formulation with said spatially modulated pattern of light until the first component is selectively polymerized into a predetermined object; and
   cooling the formulation so that the second component polymerizes to form the double network hydrogel.

2. The method of claim 1, wherein the first component comprises an amount of an acrylamide monomer.

3. The method of claim 1, wherein the amount of the acrylamide monomer comprises 16 percent by weight of the formulation.

4. The method of claim 2, wherein the second component comprises an amount of κ-carrageenan.

5. The method of claim 2, wherein the amount of κ-carrageenan comprises two percent by weight of the formulation.

6. The method of claim 5, wherein the step of maintaining the temperature of the sample holder comprises maintaining the temperature of the sample holder above 80 degrees Celsius.

7. The method of claim 1, further comprising the step of supplying more of the formulation onto the predetermined structure to form a second layer of the double network hydrogel prior to the step of cooling the formulation.

8. The method of claim 7, further comprising the step of polymerizing the second layer of the double network hydrogel while maintaining the temperature of the sample holder above the transition temperature of the second component.

9. The method of claim 1, wherein the predetermined object is an axicon lens having a cone apex angle that can form an annual ring having a diameter.

10. The method of claim 9, further comprising the step of stretching the axicon lens biaxially to increase the cone apex angle and decrease the diameter of the annual ring that can be formed by the axicon lens.

* * * * *